(12) United States Patent
Brook et al.

(10) Patent No.: US 6,566,322 B1
(45) Date of Patent: May 20, 2003

(54) CHELATING SILICONE POLYMERS

(75) Inventors: Michael A. Brook, Ontario (CA); Rodica-Sinziana Himmeldirk, Parkersburg, WV (US)

(73) Assignee: McMaster University, Hamilton (CA)

( * ) Notice: Subject to any disclaimer, the term of this patent is extended or adjusted under 35 U.S.C. 154(b) by 0 days.

(21) Appl. No.: 09/579,960

(22) Filed: May 26, 2000

Related U.S. Application Data

(60) Provisional application No. 60/136,397, filed on May 27, 1999.

(51) Int. Cl.[7] .................... C11D 3/37; C08G 77/04; C08F 283/12; C08L 83/04

(52) U.S. Cl. .................... 510/466; 528/10; 528/14; 528/22; 528/26; 528/27; 528/28; 528/29; 528/41; 525/475

(58) Field of Search ................ 528/10, 14, 22, 528/26–29, 41; 525/475; 510/466

(56) References Cited

U.S. PATENT DOCUMENTS

| | | | |
|---|---|---|---|
| 4,587,320 A | * 5/1986 | Swihart | 528/23 |
| 4,670,500 A | 6/1987 | Gupta | 524/447 |
| 5,106,609 A | 4/1992 | Bolich, Jr. et al. | 424/70 |
| 5,124,466 A | 6/1992 | Azechi et al. | 556/425 |
| 5,447,997 A | 9/1995 | Raleigh et al. | 525/474 |
| 5,641,887 A | 6/1997 | Beckman et al. | 546/26.2 |
| 5,707,613 A | 1/1998 | Hill | 424/78.03 |

FOREIGN PATENT DOCUMENTS

| | | | |
|---|---|---|---|
| DE | 4240274 A1 | * 6/1994 | C08G/77/24 |

OTHER PUBLICATIONS

US 6,001,133, 12/1999, DeYoung et al. (withdrawn)
F.L. Garvan, "Metal Chelates of EDTA and Related Substances", *Chelating Agents and Metal Chelates*; 1964; pp. 283–333 1964—No Month Given.
Michael J. Owen, "Siloxane Surface Activity", *Silicon-Based Polymer Science A Comprehensive Resource*; 1990; pp. 705–739 No Month Given.
M.J. Owenm "Surface Chemistry and Applications"; *Siloxane Polymers*; 1993; pp. 309–372 Nov. 15, 1993.
Michael A. Brook; "Silicones"; *Silicon in Organic, Organometallic, and Polymer Chemsitry*; 2000; pp. 256–308 No Month Given.
Douglas A. Skoog and Donald M. West, "Complex Formation Titrations", *Fundamentals of Analytical Chemistry*, 4th Ed.; pp. 276–300 Aug. 28, 1997.
M. He et al., "Phase Behavior and Microstructure of Polyoxyethylene Trisiloxane Surfactants in Aqueous Solution"; *The Journal of Physical Chemistry*; vol. 97, No. 34, 1993; pp. 8820–8834 Mar. 24, 1993.
Theresa E. Gentle and Steven A. Snow; "Adsorption of Small Silicone Polyether Surfactants at the Air/Water Interface"; *Langmuir*, vol. 11, No. 8, 1995; pp. 2905–2910 May 2, 1995.
E. Hochuli et al.; "New Metal Chelate Adsorbent Selective for Proteins and Peptides Containing Neighboring Histidine Residues"; *Journal of Chromatography*, 411 (1987) 177 184; pp. 177–184 Aug. 7, 1987.

(List continued on next page.)

*Primary Examiner*—Yogendra N. Gupta
*Assistant Examiner*—Brian P. Mruk
(74) *Attorney, Agent, or Firm*—Kilpatrick Stockton LLP

(57) ABSTRACT

Disclosed are silicone polymer based compounds, which include a hydrophobic silicone polymer backbone and a hydrophilic component. The hydrophilic component may act as a chelating agent to bind a metal. The hydrophilic component may be hydrophilic prior to binding with a metal or after binding. Also disclosed are methods of making these compounds. The compounds are useful in a variety of applications.

31 Claims, 6 Drawing Sheets

OTHER PUBLICATIONS

S. Zhu et al.;"Superspreading of water–silicone surfactant on hydrophobic surfaces"; *Colloids and Surfaces* A: Physicochemical and Engineering Aspects 90 (1994); pp. 63–78 Apr. 25, 1994.

K. P. Ananthapadmanabhan et al.; "A Study of the Solution, Interfacial and Wetting Properties of Silicone Surfactants"; *Colloids and Surfaces*, 44 (1990);pp. 281–297 No Month Given.

* cited by examiner

CHELATING SILICONE POLYMERS

RELATED APPLICATION DATA

This application claims priority from U.S. Provisional Patent Application No. 60/136,397, filed May 27, 1999, the specification of which is hereby incorporated by reference in its entirety.

FIELD OF THE INVENTION

This invention relates to silicone-based surfactants, and in particular silicone-based surfactants useful as chelating agents.

BACKGROUND OF THE INVENTION

A wide variety of applications require control of the interfacial properties between immiscible components, such as water-in-oil emulsions or oil-in-water emulsions. Generally, to obtain good performance it is necessary to stabilize the interface between the two immiscible components. One simple example is the use of coupling agents to modify silica surfaces so that silica may be used to reinforce organic polymers, with which it is otherwise incompatible. Another example is the use of surfactants to stabilize oils in water, such as in cleaning and conditioning applications.

Silicones are among the most surface-active materials ("surfactants") known. They diffuse rapidly to interfaces and readily spread. Spreading of the silicone may be facilitated by the incorporation of polar groups on the silicone backbone. Some of the most effective spreading compounds, particularly at solid/liquid/air surfaces, are the so-called "superwetters" made by manufacturers including Crompton Corp. and Dow Corning. The general structure of these superwetters is $(Me_3SiO)_2SiMe(CH_2)_3(OCH_2CH_2)_nOZ$, where Z may be H, $CH_3$, $CH_3COO$, etc.

Liquid-liquid interfaces are generally stabilized with silicones bearing non-ionic hydrophilic groups. Common examples include derivatives of so-called silicone polyols; that is silicones containing polyether sidechains. U.S. Pat. No. 5,707,613 to Hill teaches that these compounds are particularly useful water/silicone interfaces. Ionic silicone copolymers can also be used to stabilize such interfaces. U.S. Pat. No. 5,124,466 to Azechi et al. (Shin-Etsu) teaches that ammonium-modified silicone surfactants are useful in the stabilization of silicone emulsions in water.

The surface activity of silicones, whether cationic, zwitterionic or non-ionic, cannot be readily changed, although pH modifications may affect the behavior of some types of ammonium compounds. There are advantages in being able to change the surface activity of a surface active material so as to change the properties of systems in accordance with its particular use, for example, to flocculate emulsions on demand. For example, carboxylic acids and polymers derived from them (e.g., CARBOPOL™ (available from BF Goodrich)) change their ability to swell water and to stabilize interfaces upon pH changes: bases convert neutral carboxylic acids to carboxylates. In this respect, silicones having a pH sensitivity, by virtue of amine or carboxylic acid groups, are known. U.S. Pat. No. 5,447,997 to Releigh et al. teaches silicones containing carboxylic acids whose surface properties change as a function of pH.

The properties of ionic surfactants may not only be changed by pH, but by the nature of the counterions. For example, carboxylates with monovalent counterions such as sodium swell well with water. In contrast, multivalent counterions in the same system, lead to ionic crosslinking and a reduction of swelling. At an interface, the surface activity of such materials are similarly affected by the nature of the counterion.

Multidentate ligands (or "chelating agents") bind metals very tightly. The classic example is EDTA (ethylenediaminetetraacetic acid). EDTA, normally in its calcium, disodium salt form, is frequently found in food products. Heavy metal ions coming into contact with the EDTA will complex with the amine and carboxylic acid groups, displacing the sodium/calcium ions. The binding efficiency of EDTA and its derivatives is known for many metals and their different oxidation states. Chelating agents are added to many different formulations for different purposes. They have also been bound to polymers. For example, chelating groups similar to those mentioned above are used as supports in affinity chromatography.

However, there still exists a need for silicones that are effective at chelating metal ions using complementary binding, whose properties may be controlled through the relative amounts and morphology of the hydrophilic and hydrophobic blocks, the chelating agent, the pH of the solution, the presence or absence of multivalent counterions, and the specific nature of the multivalent ions.

SUMMARY OF THE INVENTION

The present invention relates to silicone polymers useful as both surfactants and chelating agents. The polymers contain a hydrophobic component (the silicone polymer backbone) and a hydrophilic component. The hydrophilic component may act as a chelating agent; i.e. it will bind a variety of metals. The hydrophilic component may be hydrophilic prior to binding to a metal, or after binding to a metal.

The hydrophobic nature of the silicone is provided by organic radicals, such as methyl or other alkyl groups, modified alkyl groups such as fluoroalkyl groups, aryl groups, and related hydrophobic moieties, bound to the silicon atoms in the polymer. The hydrophilic component includes multiple ligands to cooperatively bind one or more metal centers. Examples of such ligands are well known in the art, and include hydrophilic groups such as carboxylic acids and their derivatives, amines, phosphines, alcohols, and unsaturated systems (multiple bonds) that are or are rendered hydrophilic upon complexation with a metal ion.

In one aspect, the present invention relates to a silicone polymer comprising a hydrophobic polysiloxane backbone and at least one metal binding site which is covalently bound to the hydrophobic polysiloxane backbone, the at least one metal binding site comprising at least two ligands which are optionally bound to a metal.

In one embodiment, at least one of the ligands is hydrophilic either before or after being bound to a metal. The ligand may include groups selected from functional alkyl groups bearing heteroatom-based ligands, functional aryl groups bearing heteroatom-based ligands, functional alkyl groups bearing heteroatom-based ligands where the ligands have exchangeable hydrogen atoms, functional aryl groups bearing heteroatom-based ligands where the ligands have exchangeable hydrogen atoms, functional alkyl groups having π-ligands, and functional aryl groups having π-ligands. Preferably, the metal binding sites include two or more carboxylic acids which may act as ligands.

The metal binding site may be covalently bonded to the silicone polymer backbone by a linker, which is at least as stable to hydrolysis as the siloxane linkage in the silicone polymer. The linker may be selected from single atoms including C, N, O, S, or P, or groups including amides, esters, thioesters, urethanes, ureas, alkyl or aryl groups.

The polymers of the invention may have molecular weights from about 500 to about 500,000 g/mol.

In one embodiment, the invention relates to a compound of the formula I:

$$T_1(Q_1)_a(Q_2)_b(Q_3)_c T_2 \quad (I)$$

where a, b and c are independently greater than or equal to 0; and where $Q_1$, $Q_2$ and $Q_3$ are independently the same or different and are an internal siloxane group of the formula II:

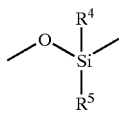
(II)

and, where $R^4$ and $R^5$, for each internal siloxane group, are the same or different, and where $R^4$ and $R^5$ are independently, H with the proviso that both $R^4$ and $R^5$ are not H on the same internal siloxane group, alkoxy, siloxy, alkyl, aryl, functional alkyl, functional aryl, a metal-binding site comprising at least two ligands optionally bound to a metal, or a group having an internal siloxane group of the formula III:

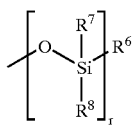
(III)

where r is $\geq 0$;

$R^7$, and $R^8$, are for each internal siloxane group of the formula III the same or different, and $R^6$, $R^7$, and $R^8$ are independently, H with the proviso that not more than one of $R^6$, $R^7$, and $R^8$ on each internal siloxane group is H, alkoxy, siloxy, alkyl, aryl, functional alkyl, functional aryl, or a metal binding site comprising at least two ligands optionally bound to a metal;

$T_1$ is a group of the formula (IV):

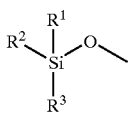
(IV)

$T_2$ is a group of the formula (V):

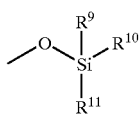
(V)

wherein $R^1$, $R^2$, $R^3$, $R^9$, $R^{10}$, $R^{11}$, are independently, H with the proviso that each silicon atom has no more than one H, alkoxy, siloxy, alkyl, aryl, functional alkyl, functional aryl, or a metal binding site comprising at least two ligands optionally bound to a metal;

with the proviso that at least one of $R^1$ to $R^{11}$ is a metal binding site comprising at least two ligands optionally bound to a metal, and with the proviso that the molecular weight of the compound is between 500 and 500,000 g/mol.

BRIEF DESCRIPTION OF THE DRAWINGS

The present invention will be better understood when the following description is read in connection with the accompanying drawings, in which.

DESCRIPTION OF THE PREFERRED EMBODIMENT

Figure 1:
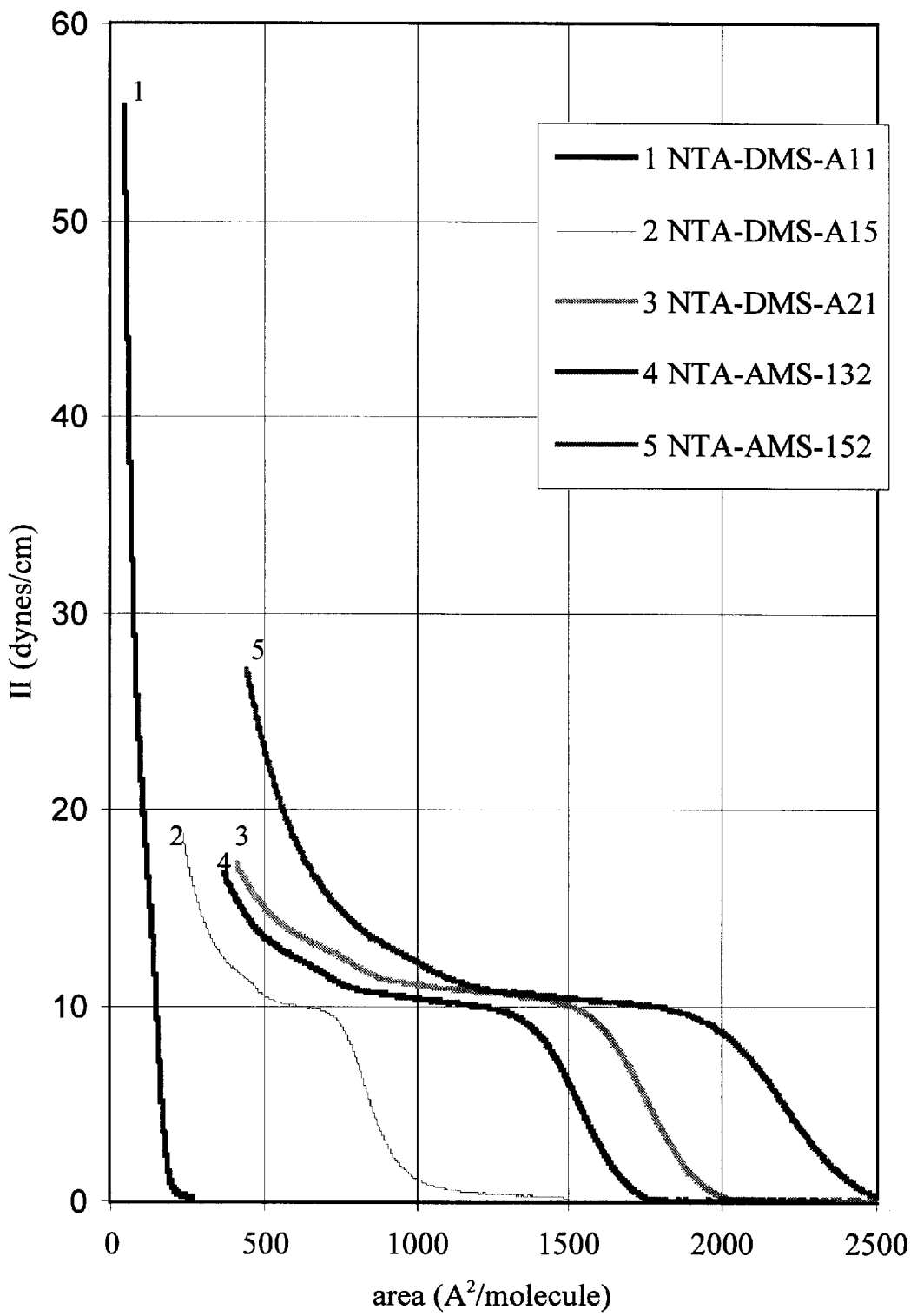
FIG. 1 is a graph of surface pressure versus area on water subphase for various compounds made in accordance with the present invention.

In this document, the following terms have the meaning defined, unless otherwise described:

Hydrophobic: groups or molecules that would not normally be soluble in water;

Hydrophilic: groups or molecules that would normally be soluble in water;

Ligand: a chemical group capable of binding to a metal;

Alkyl: an aliphatic hydrocarbon, linear, branched and/or cyclic having up to 20 carbon atoms;

Aryl: a hydrocarbon residue base, having up to 20 carbons and containing at least one conjugated cyclic substructure, which cyclic structure may contain an O or N, and which cyclic structure may be substituted at a substitutable position with an alkyl group;

Functional alkyl: an alkyl group having one or more functional groups selected from halogens (F, Cl, Br, I); hydroxy groups (OH); thiols (SH), sulfides (SR, where R=alkyl, functional alkyl, aryl, or functional aryl), disulfides (SSR, where R=alkyl, functional alkyl, aryl or functional aryl groups), alkoxy groups (RO, where R=alkyl, functional alkyl, aryl or functional aryl); primary amine ($NH_2$), secondary amine (RNR', where R and R'=alkyl, functional alkyl, aryl or functional aryl groups) or tertiary amino groups ($R_2N$, where R=independently, alkyl, functional alkyl, aryl or functional aryl groups); primary phosphino ($PH_2$), secondary phosphino (RPH, where R=alkyl, functional alkyl, aryl or functional aryl) or tertiary phosphino groups (RR'P, where R and R'=alkyl, functional alkyl, aryl or functional aryl groups); carboxylic acids (COOH) and their derivatives including esters (COOR, where R=alkyl, functional alkyl, aryl or functional aryl), thioesters (COSR, CSOR, where R=alkyl, functional alkyl, aryl or functional aryl) and amides (CONH2, CONHR, CONRR', where R and R'=alkyl, functional alkyl, aryl or functional aryl groups), carbonates (ROCO2R') or derivatives (urethanes OCONH2, OCONHR, OCONRR', NHCOOR, NR'COOR, ureas (NHCONH2, NRCONH2, NHCONRH, NHCONRR', NRCONHR', NRCONR'R", where R,R' and R"=alkyl, functional alkyl, aryl or functional aryl groups), aldehydes (CHO), ketones (COR, where R=alkyl, functional alkyl, aryl or functional aryl), alkenes (C=C) and alkynes (C≡C);

Functional aryl: an aryl group having one or more functional groups substituted at a substitutable position groups selected from halogens (F, Cl, Br, I); hydroxy groups (OH); thiols (SH), sulfides (SR, where R=alkyl, functional alkyl, aryl, or functional aryl), disulfides (SSR, where R=alkyl, functional alkyl, aryl or functional aryl groups), alkoxy groups (RO, where R=alkyl, functional alkyl, aryl or functional aryl); primary amine (NH$_2$), secondary amine (RNR', where R and R'=alkyl, functional alkyl, aryl or functional aryl groups) or tertiary amino groups (R$_2$N, where R=independently, alkyl, functional alkyl, aryl or functional aryl groups); primary phosphino (PH$_2$), secondary phosphino (RPH, where R=alkyl, functional alkyl, aryl or functional aryl) or tertiary phosphino groups (RR'P, where R and R'=alkyl, functional alkyl, aryl or functional aryl groups); carboxylic acids (COOH) and their derivatives including esters (COOR, where R=alkyl, functional alkyl, aryl or functional aryl), thioesters (COSR, CSOR, where R=alkyl, functional alkyl, aryl or functional aryl) and amides (CONH2, CONHR, CONRR', where R and R'=alkyl, functional alkyl, aryl or functional aryl groups), carbonates (ROCO2') or derivatives (urethanes OCONH2, OCONHR, OCONRR', NHCOOR, NR'COOR, ureas (NHCONH2, NRCONH2, NHCONRH, NHCONRR', NRCONHR', NRCONR'R", where R, R' and R"=alkyl, functional alkyl, aryl or functional aryl groups), aldehydes (CHO), ketones (COR, where R=alkyl, functional alkyl, aryl or functional aryl), alkenes (C=C) and alkynes (C≡C);

Functional alkyl groups bearing heteroatom-based ligands: the subset of functional alkyl, having one or more O, N, or S atoms including hydroxy, thiols, sulfides, disulfides, alkoxy, primary, secondary and tertiary amino groups, primary, secondary and tertiary phosphino groups, carboxylic acids and their derivatives including esters, thioesters, amides, carbonates or their derivatives including urethanes, ureas, aldehydes, and ketones;

Functional aryl groups bearing heteroatom-based ligands: the subset of functional aryl, having one or more O, N, or S atoms including hydroxy, thiols, sulfides, disulfides, alkoxy, primary, secondary and tertiary amino groups, primary, secondary and tertiary phosphino groups, carboxylic acids and their derivatives including esters, thioesters, amides, carbonates or their derivatives including urethanes, ureas, aldehydes, and ketones;

Functional alkyl groups bearing heteroatom-based ligands where the ligands possess exchangeable hydrogens: the subset of functional alkyl, having a group selected from OH, NH, SH, or PH;.

Functional aryl groups bearing heteroatom-based ligands where the ligands possess exchangeable hydrogens: the subset of functional aryl, having a group selected from OH, NH, SH or PH;

Functional alkyl groups bearing ligands: the subset of functional alkyl groups, having unsaturation in the form of double bonds between C and Y and/or between N and Y, where Y is S, O, NR, PR, CRR', and/or triple bonds between C and Z, where Z is CR or N; and where R, and R$^1$ are independently selected from alkyl, functional alkyl, aryl, functional aryl, OH, NH, SH, or PH;

Functional aryl groups bearing ligands: the subset of functional aryl groups, having unsaturation in the form of double bonds between C and Y and/or between N and Y, where Y is S, O, NR, PR, CRR', and/or triple bonds between C and Z, where Z is CR or N; and where R, and R$^1$ are independently selected from alkyl, functional alkyl, aryl, functional aryl, OH, NH, SH, or PH;

Metal: all metals of the periodic table, including without limitation, alkali metals, alkaline earth metals, transition metals, lanthanides, actinides, and Group 13 elements including Boron.

Those skilled in the art will appreciate that there are combinations of functional groups that will react (e.g., amines+alkyl halides) which are thus mutually incompatible. These combinations are not to be inferred in the following discussion.

In accordance with the present invention, a silicone polymer backbone has at least one covalently bonded metal binding site. The metal binding site has at least two ligands such that any metallic binding is at least bidentate, although it may also have three, four, five or more binding sites (i.e. it may be tri, tetra, penta, hexa, etc. dentate). Generally, the silicone polymer may be any polysiloxane structure which is hydrophobic in nature. The term "silicone polymer" and "polysiloxane" are used interchangeably herein.

More preferably, the silicone polymer backbone may be a compound of the formula I:

$$T_1(Q_1)_a(Q_2)_b(Q_3)_c T_2 \qquad (I)$$

where a, b and c are independently greater than or equal to 0; and where $Q_1$, $Q_2$ and $Q_3$ are independently the same or different and are an internal siloxane group of the formula II:

(II)

$R^4$ and $R^5$, for each internal siloxane group, are the same or different, and where $R^4$ and $R^5$ are independently, H with the proviso that both $R^4$ and $R^5$ are not both H on the same internal siloxane group, alkoxy, siloxy, alkyl, aryl, functional alkyl, functional aryl, a metal-binding site comprising at least two ligands optionally bound to a metal, or a group having an internal siloxane group of the formula III:

(III)

where r is ≧0;

$R^7$, and $R^8$, for each internal siloxane group are the same or different, and $R^6$, $R^7$, and $R^8$ are independently H with the proviso that not more than one of $R^6$, $R^7$, and $R^8$ is H on any siloxane group, alkoxy, siloxy, alkyl, functional alkyl, aryl, functional aryl, or a metal binding site comprising at least two ligands optionally bound to a metal;

$T_1$ is a group of the formal (IV);

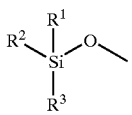

(IV)

$T_2$ is a group of the formal (V);

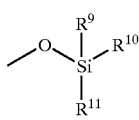

(V)

where, $R^1, R^2, R^3, R^9, R^{10}, R^{11}$, are independently, H with the proviso that each silicon atom has no more than one H, alkoxy, siloxy, alkyl, functional alkyl, aryl, functional aryl, or a metal binding site comprising at least two ligands optionally bound to a metal;

with the proviso that at least one of $R^1$ to $R^{11}$ is a metal binding site comprising at least two ligands optionally bound to a metal and with the proviso that the molecular weight of the compound is between about 500 and about 500,000 g/mol.

Some more specific examples of suitable substituents for $R^1$ to $R^{11}$ include linear, branched and cyclic saturated alkyl groups having up 20 carbons such as methyl ethyl, n-propyl, i-propyl, n-butyl, i-butyl, t-butyl, pentyl, n-hexyl, cyclohexyl etc., linear, branched and cyclic alkoxy groups having up to 20 carbon atoms such as methoxy, ethoxy, propoxy, butoxy, cyclopentyloxy, etc., unsaturated non-cyclic hydrocarbon groups having up to 20 carbon atoms such as vinyl, allyl, propargyl, etc., unsaturated derivatives of fatty acids having up to 20 carbon atoms such as linolenyl groups, unsaturated cyclic hydrocarbon groups such as cyclopentadienyl, and aryl groups such as phenyl, tolyl, benzyl, naphthyl, etc. These substituents may be substituted at a substitutable position with a halogen such as fluorine, chloride, bromine or iodine, or with a hydroxy, alkoxy, amino group, etc. It will be appreciated, however, that the substituents should not materially affect the hydrophobic properties of the silicone polymer backbone.

The silicone polymer may have a molecular weight (g/mol) between about 500 and about 500,000, preferably between about 500 and about 15,000 and more preferably between about 1,500 and about 15,000.

It will be appreciated that compounds of the formula I include those polysiloxanes having a "linear" backbone, as well as those having a "branched" backbone structure.

The compounds include at least one covalently bound site capable of binding a metal. This site will possess multiple ligands (>1, i.e., bi-, tri-, tetra-, penta-, or hexadentate), which may be the same or different. Preferably, the site will have three or more ligands capable of binding a metal.

The metal-binding sites may be covalently bonded to the silicone polymer backbone at one or both of the polymer's terminal ends. Alternatively, or in addition, the metal-binding sites may be covalently bonded to the polymer backbone in periodic fashion. Although this may include a random or block distribution of $Q_1$, $Q_2$ and $Q_3$ in formula (I):

$$T_1(Q_1)_a(Q_2)_b(Q_3)_cT_2 \qquad (I)$$

preferably, the metal-binding sites are periodically bonded to the silicone polymer backbone at intervals between about every $5^{th}$ to about every $200^{th}$ internal Si—O-group. It will be appreciated by those skilled in the art that the desired periodic interval between the metal-binding sites will depend upon factors such as steric hindrance, polarity of the resulting compound and the specific demands of the application in which the compounds are used.

The metal-binding site includes ligands capable of binding a metal, provided that, either before or after metal complexation, they are hydrophilic. Many metal ligands are known to those skilled in the art, and for example, are described in Cotton F. A. and Wilkinson G., Advanced Inorganic Chemistry, $3^{rd}$ ed (1972: Wiley & Sons, N.Y.), and King R. B., Encyclopedia of Inorganic Chemistry, (1994: Wiley and Sons, Chichester, Vol. 2, pp. 777–821) which are hereby incorporated by reference in their entirety.

Preferably, the ligands are functional alkyl groups bearing heteroatom-based ligands, functional aryl groups bearing heteroatom-based ligands, functional alkyl groups bearing heteroatom-based ligands where the ligands possess exchangeable hydrogens, functional aryl groups bearing heteroatom-based ligands where the ligands possess exchangeable hydrogens, functional alkyl groups bearing R-ligands, or functional aryl groups bearing π-ligands. More preferably, the metal binding sites have as ligands two or more carboxylic acid groups. Most preferably, the metal binding sites are selected from the following groups;

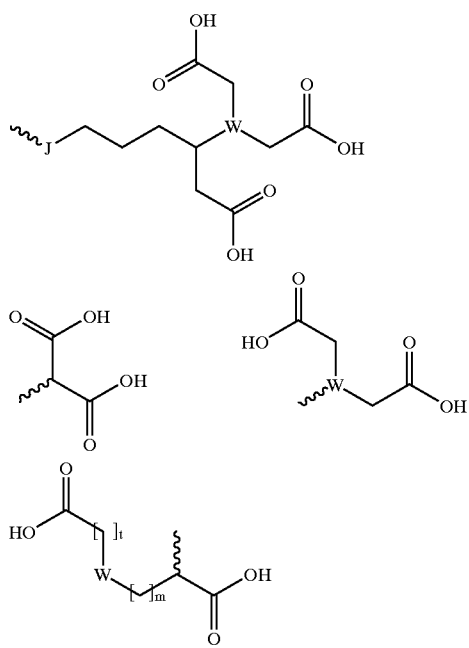

-continued

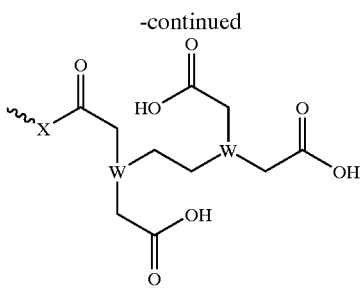

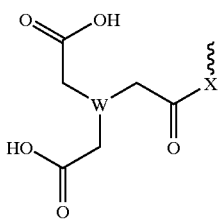

where
W is N, P or C; X is C, N or O; J is N, O, S, P or C; t is between 1 and 10;
m is between 0 and 10 and the wavy line denotes direct or indirect attachment of the metal binding site to the hydrophobic polysiloxane backbone.

The metal binding sites include a linker to covalently bond the metal binding site to the silicone polymer backbone. Suitable linkers, and methods of their preparation, are known to those skilled in the art, and include those described in Brook M. A., Silicon in Organic, Organometallic and Polymer Chemistry (2000: Wiley & Sons, N.Y) which is hereby incorporated by reference in its entirety.

Preferably, the linkers are selected from single C, N, O, S, or P atoms, or more complex functional groups including amides, esters, thioesters, urethanes, ureas, alkyl, aryl, functional alkyl and functional aryl groups.

Most preferably, the linkers are selected from the following groups including —CO—(CH$_2$)$_k$SiR$_3$, —XCO—CH$_2$)$_k$SiR, —(CH$_2$)$_k$SiR$_3$ or —OCX—(CH$_2$)$_k$SiR$_3$. where X is C, O, N, or S, k is between 0 and 10, and SiR$_3$ represents the silicone polymer backbone Some examples of specific linkers, include:

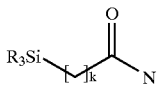 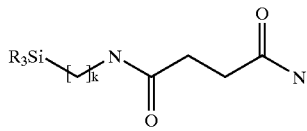

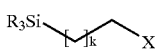 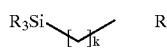

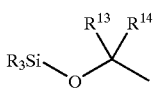 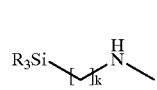

where
k is between 0 and 10; X is C, N, O, S; R$^{12}$ is hydrogen, alkyl, aryl, functional alkyl or functional aryl; and R$^{13}$ and R$^{14}$ are independently hydrogen, alkyl, aryl, functional alkyl, functional aryl, alkoxy or siloxy, and where R$_3$Si is the silicone polymer backbone.

Some specific examples of metal binding sites including linkers are:

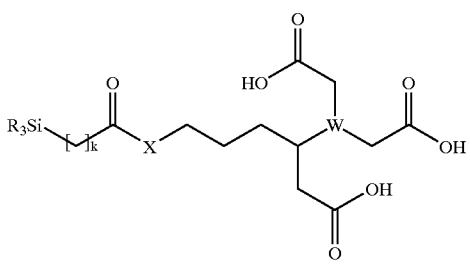

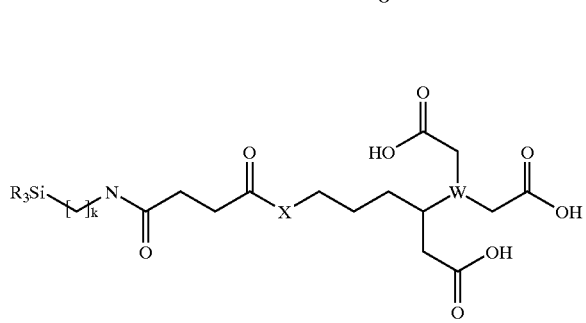

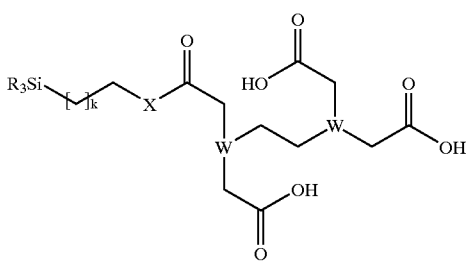

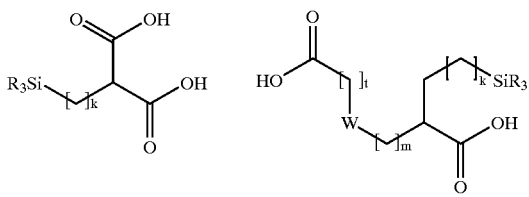

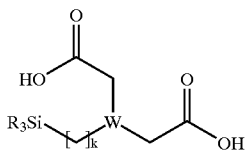

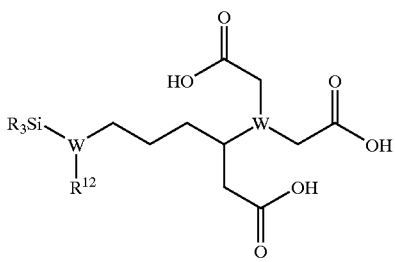

-continued

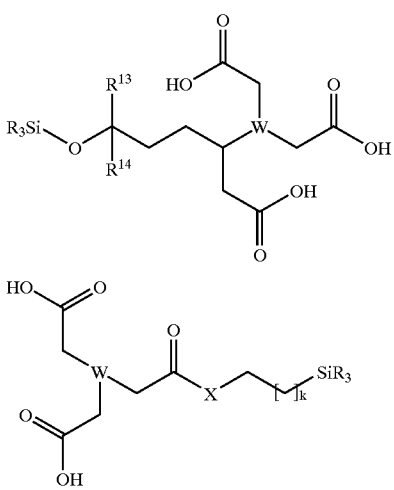

where W is N, P, or C; X is C, N, O or S; t is between 1 and 10; k and m are between 0 and 10; $R^{12}$ is hydrogen, alkyl, aryl, functional alkyl or functional aryl; and $R^{13}$ and $R^{14}$ are independently hydrogen, alkyl, aryl, functional alkyl, functional aryl, alkoxy or siloxy, and where $R_3Si$ is the silicone polymer backbone.

The metal to which the ligand may bind may be any metal. Preferably, the metal is charged metal ion, which may be bound by a metal binding site. More preferably, the metal ion is selected from the group of charged metal ions including $Ca^{2+}$, $Mg^{2+}$, $Ni^{2+}$, $Fe^{3+}$, $Cu^{2+}$, and $Co^{2+}$.

As will be appreciated, by incorporating the described metal binding sites, the properties of the silicone polymers may be changed by modification of solution pH, and by complexing metals of different charge states to the polymer. For example, the following scheme demonstrates how a neutral compound may be converted into an ionic species by increasing pH or by the binding of a multivalent metal ion.

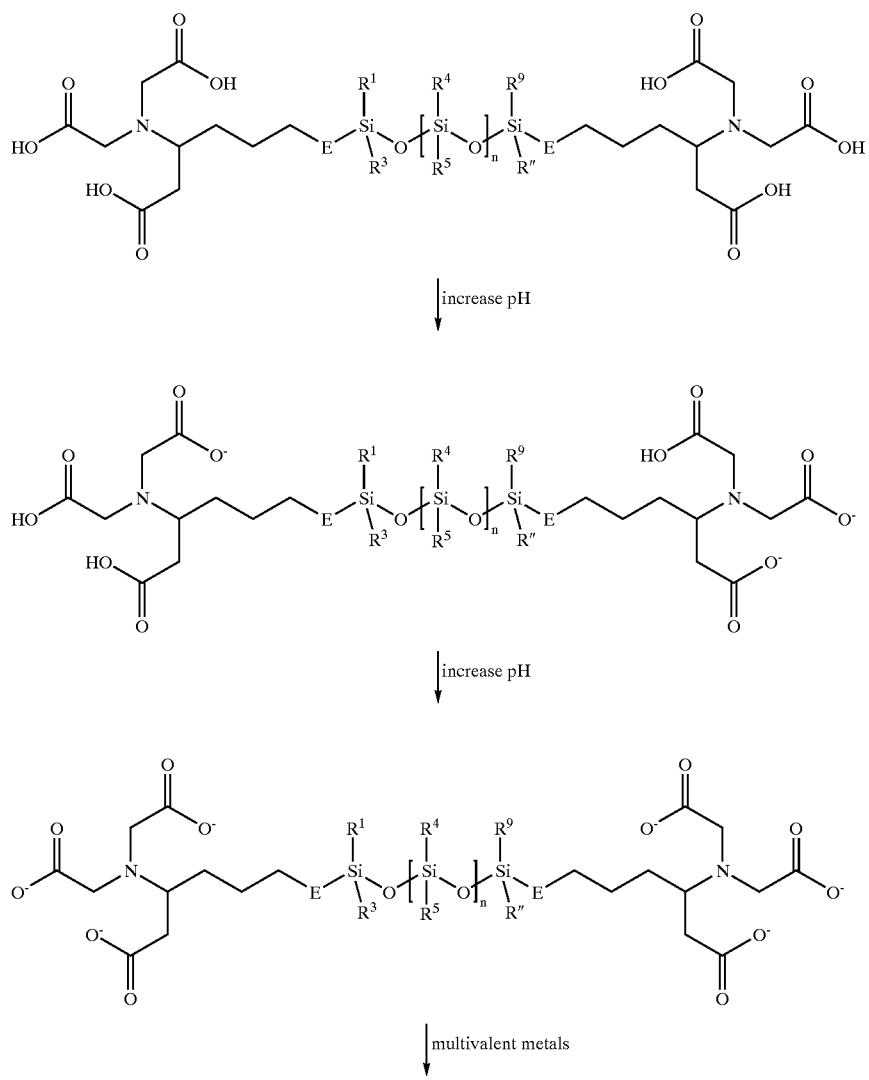

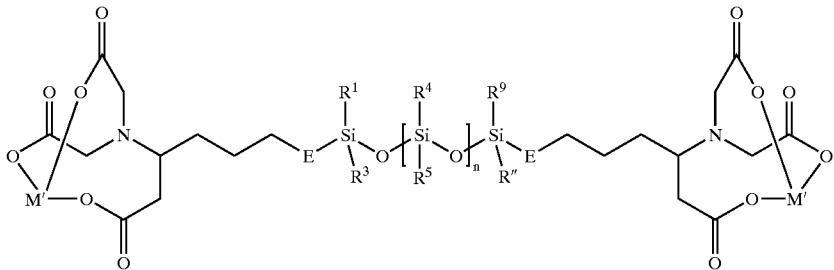

The compounds of the present invention may be prepared by the following general synthesis, which is exemplified in the later described specific examples.

Preferably, in the first instance, a linker is grafted to the chelating group. In a subsequent or concomitant step, the linker is covalently grafted to a functionalized silicone. There are many convenient routes that may be utilized, which will be readily apparent to those skilled in the art. Some, without limitation, are provided to demonstrate the flexibility of the approach.

The linker (already bonded with the chelator) may be grafted to a functionalized silicone polymer in any of the following methods:

Amine: To a haloalkyl-modified silicone (e.g., $R_3Si[CH_2]_3Cl$), in a suitable organic or aqueous solvent, is added a linker that is bound to a chelating group containing an amine. Preferably the amine is a primary or secondary amine ($H_2NR^{-CHEL}$). The reaction leads to the chelating silicone $R_3Si[CH_2]_3NHR^{-CHEL}$.

Alternatively, to an alcohol-modified silicone (e.g., $R_3Si[CH_2]_3OH$), in a suitable organic or aqueous solvent, is added a linker that is bound to a chelating group containing a haloalkane group, ($X[CH_2]_nCHEL$). The reaction leads to the chelating silicone $R_3Si[CH_2]_3O[CH_2]_nCHEL$.

Ether: To a haloalkyl-modified silicone (e.g., $R_3Si[CH_2]_3Cl$), in a suitable organic or aqueous solvent, is added a linker that is bound to a chelating group containing an alcohol ($HOR^{-CHEL}$). The reaction leads to the chelating silicone $R_3Si[CH_2]_3OR^{-CHEL}$.

Ester: To an alcohol-modified silicone (e.g., $R_3Si[CH_2]_3OH$), in a suitable organic or aqueous solvent, is added a linker that is bound to a chelating group having an activated carboxylic acid group (acid anhydride, acid halide, activated ester, e.g., N-hydroxysuccimide ester) ZCOCHEL. The reaction leads to the chelating silicone, $R_3Si[CH_2]_3OCOCHEL$.

Amide: To an amine-modified silicone (e.g., $R_3Si[CH_2]_3NH_2$), in a suitable organic or aqueous solvent, is added a linker that is bound to a chelating group having an activated carboxylic acid group (acid anhydride, acid halide, activated ester, e.g., N-hydroxysuccimide ester) ZCOCHEL. The reaction leads to the chelating silicone, $R_3Si[CH_2]_3NCOCHEL$.

The linker may be grafted to the chelating group in an analogous manner, using standard organic functional group chemistry, e.g., via amines, esters, ethers and amides.

The compounds of the present invention may have a variety of applications. While the materials possess interesting surface activity in the absence of metal, they have the additional possibility of undergoing changes in surface activity as a function of stimuli including pH and the addition of different metals of different valency and charge. They may be used in applications requiring the interaction of silicone polymers with proteins, for example personal care products such as hair conditioners or hand creams, in the isolation and purification of proteins by affinity chromatography, in the stabilization of proteins for delivery in washing powders or in drug delivery systems. They may also be used as surfactants and emulsifiers in a wide variety of applications requiring control of the surface activity, since their properties may be modified on demand. They may also be used in the stabilization of interfaces of minerals, for example, calcium carbonate, in hydrophobic media or to is hydrophobize such compounds for use in aqueous systems. These examples of uses are intended only to be illustrative, and not limiting. Skilled artisans will understand and appreciate a wide range of useful applications for the compounds of the present invention.

The following examples, which are non-limiting, are illustrative of the present invention. The scope of the invention is limited only by the claims.

EXAMPLES

General

As more completely described below, poly(dimethylsiloxane) oligomers functionalized with terminal and pendant NTA chelating groups were prepared by a linear multistep synthesis utilizing, until the last step, ester-protected carboxylic acids. The starting materials were commercially available aminopropylsilicones. This approach avoided separation steps that were difficult because of the high surface activity of both the intermediate and ultimate hydrophilically-modified silicones (the final compounds and their intermediates were capable of efficiently stabilizing emulsions, as evidenced during attempted washing of reaction mixtures containing the compounds, water and either ether or chlorinated hydrocarbons).

Chart 1: NTA- and succinyl-silicone chelators: terminal functionalizatio n

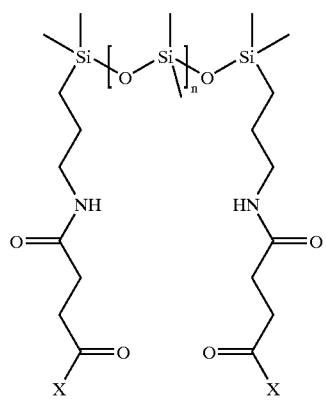

-continued

X = OH

| Compound | MW | Yield[a] |
|---|---|---|
| SUCC-DMS-A11 | 1075 | 95 |
| SUCC-DMS-A15 | 3200 | 95 |
| SUCC-DMS-A21 | 5200 | 95 |

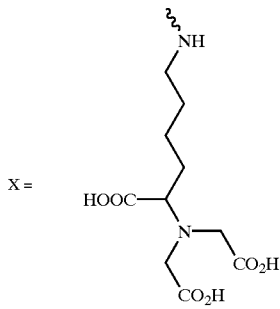

| Compound | MW | Yield[a] |
|---|---|---|
| NTA-DMS-A11 | 1550 | 95 |
| NTA-DMS-A15 | 3690 | 52 |
| NTA-DMS-A21 | 5690 | 65 |

[a] starting from the amino silicone

Chart 2: NTA-and succinyl-silicone chelators: pendant functionalization

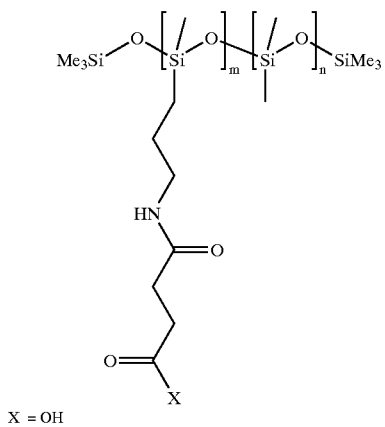

X = OH

| Compound | MW | mol% chelator | Yield |
|---|---|---|---|
| SUCC-AMS-132 | 4670–5670 | 2–3 | 86 |
| SUCC-AMS-152 | 7440–8440 | 4–5 | 66 |
| SUCC-AMS-162 | 4370–5370 | 6–7 | 70 |

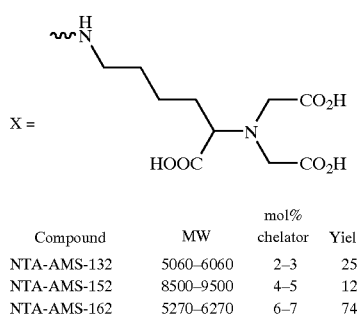

| Compound | MW | mol% chelator | Yield |
|---|---|---|---|
| NTA-AMS-132 | 5060–6060 | 2–3 | 25 |
| NTA-AMS-152 | 8500–9500 | 4–5 | 12 |
| NTA-AMS-162 | 5270–6270 | 6–7 | 74 |

The chelating agent used in these reactions, N-,N-bis(carboxymethyl)-L-lysine (NTA), was derived from lysine according to the procedure presented by Hochuli et al. (J. Chromatogr. 1987, 411, 177) that utilizes carboxymethylation of Z-protected (Z=C$_6$H$_5$CH$_2$OCO~) lysine and subsequent deprotection/reprotection steps (Scheme 1 below). The final product (NTA) was purified by trituration with hot methanol and then recrystallization, or by desalting on a column filled with Sephadex-G10 size exclusion gel (MW cutoff <700), followed by lyophilization. These purification steps were not trivial.

Scheme 1

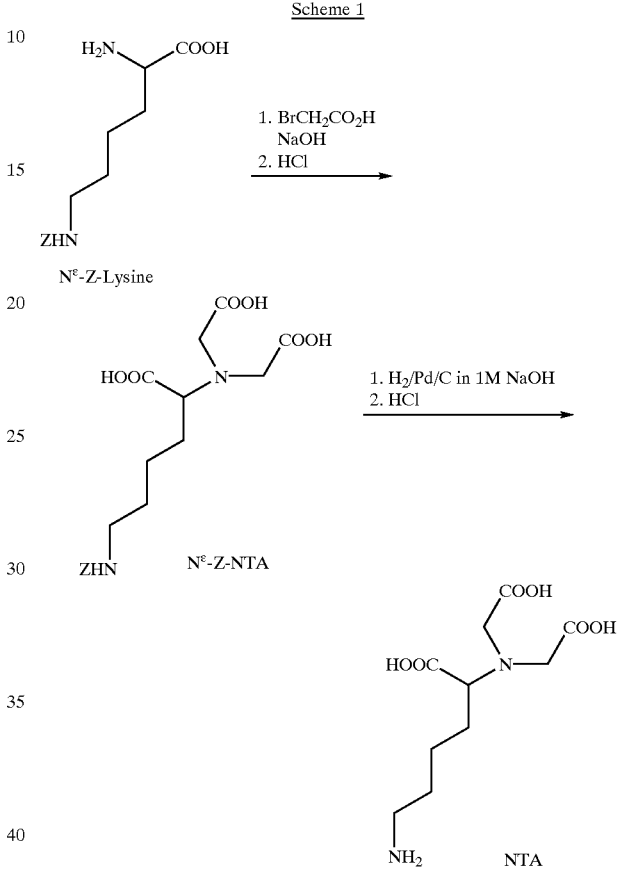

The synthesis of the chelating silicones began with commercially available aminopropylsilicones, both terminal and pendant. The general synthesis is shown in Schemes 2 and 3. Standard reactions for peptide synthesis were utilized. N-tert-Butyloxycarbonyl-NTA tricesium salt was synthesized from NTA and di-tert-butyldicarbonate and used for the next step without further purification (BOC=N-tert-Butyloxycarbonyl). The introduction of the benzyl groups, using benzyl bromide met with some difficulties and the low yield (45% after silica gel chromatography) was due to the fact that significant amounts of mono and di-benzyl esters were obtained along with the desired tribenzyl ester.

The BOC group was removed by treatment with trifluoroacetic acid and the product (as a TFA salt) was used for the next step without further purification. The primary amino group of the NTA-benzyl ester was reacted with succinic anhydride (96% yield), and the free carboxylic acid group of the succinyl-NTA-benzyl ester was esterified with N-hydroxysuccinimide, to give the activated ester that, after silica gel chromatography, was stable at 8° C. for at least 2 weeks (Scheme 2).

In the penultimate step (Scheme 3), the aminopropyl-functional silicone was reacted with a 10–15% molar excess of N-SSU-NTA-Bn ester to generate a stable amide bond.

Excess NTA reactant was consumed by small amounts of AMS-162, an aminopropyl-methylsiloxane-dimethylsiloxane having 7–8% mol amino groups and $M_w$ 4000–5000. These compounds, and the excess NTA with which they reacted, were completely retained by silica gel during the column chromatography purification step. The final step of the synthesis involved the removal of the benzyl protective groups by hydrogenation in the presence of palladium on charcoal. The end functional-silicone chelators were obtained in higher yields (93–100%) after catalyst and solvent removal, than the pendant silicone chelators: NTA-AMS-132 and NTA-AMS-152 were obtained in 47% and 33% yield, respectively. The removal of the catalyst was quite difficult for these two cases, due to the formation of very fine water/oil dispersions. This route provided a generic two step synthesis for a variety of silicone chelators, with the chelating moiety attached either to the ends or pendant from the polysiloxane backbone. Although these compounds were somewhat difficult to characterize as the free carboxylic acids, except by electrospray-mass spectroscopy, the structures of the penultimate tribenzyl esters were easily determined by $^1$H-NMR, $^{13}$C-NMR, FT-IR, GPC.

Scheme 2

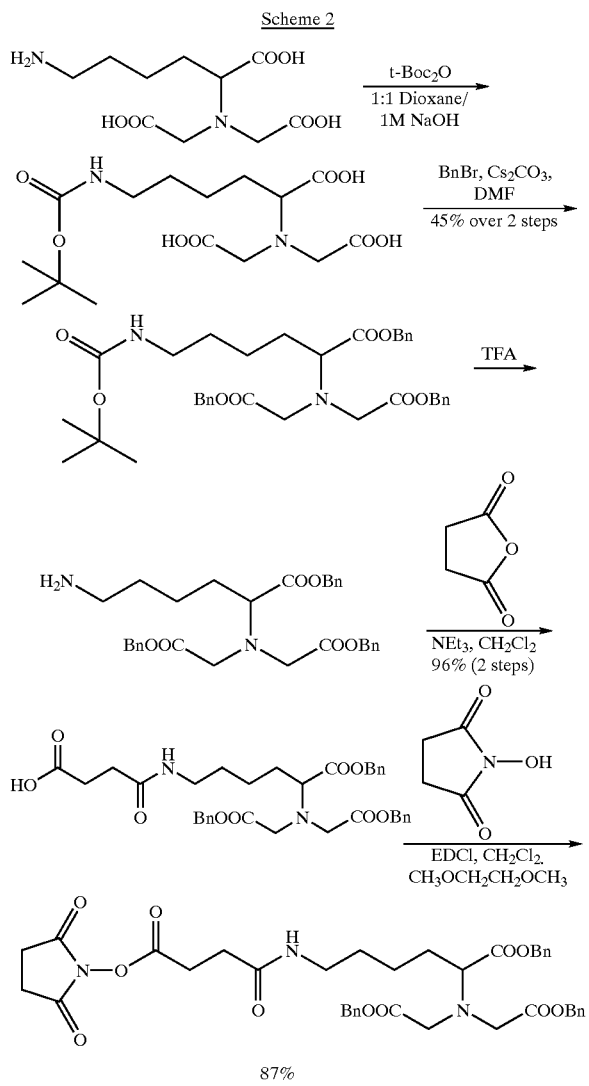

Scheme 3

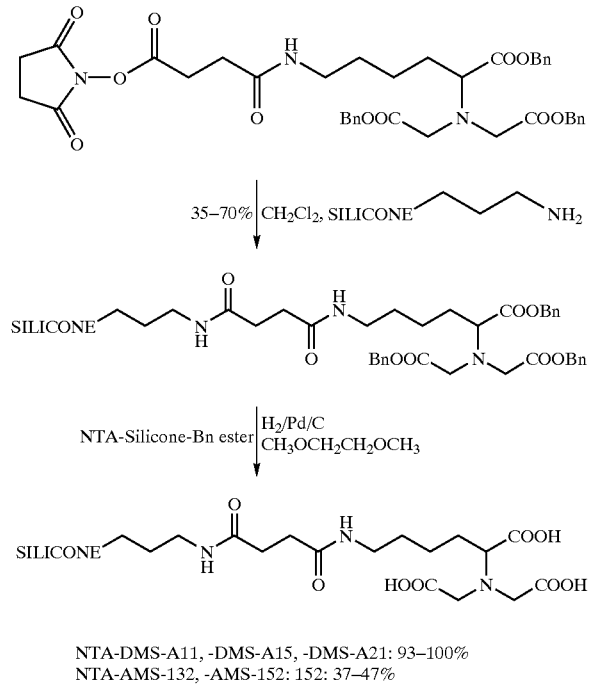

NTA-DMS-A11, -DMS-A15, -DMS-A21: 93–100%
NTA-AMS-132, -AMS-152: 152: 37–47%

Alternatively, the chelating silicone may be prepared starting from the aminosilicones. In this case, ester protection was not used. Activation of the carboxyl groups on the silicones (2.5 parts) was performed by reaction with N-hydroxysuccinimide (5 parts) in the presence of 1-ethyl-3-(3-dimethylaminopropyl)carbodiimide hydrochloride (5 parts) in 1,2-dimethoxyethane (220 parts). After removal of the solvents in vacuo, the residue was dissolved in methylene chloride (900 parts), washed with water, 1N HCl and then dried over sodium sulfate (Scheme 4).

The succinimidyl-terminated polydimethylsiloxane (65 parts) dissolved in 1,2-dimethoxyethane (150 parts) was vigorously stirred with $N^\alpha,N^\alpha$-bis(carboxymethyl)-L-lysine sodium salt (1.5 parts) dissolved in water (270 parts) overnight. The two layers were separated and the solvents were removed in vacuo from the bottom aqueous layer. The solid obtained was purified by dialysis against deionized water. Lyophilization led to the desired product as a white solid.

Scheme 4

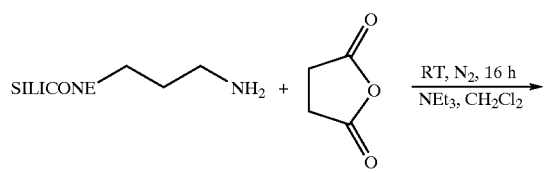

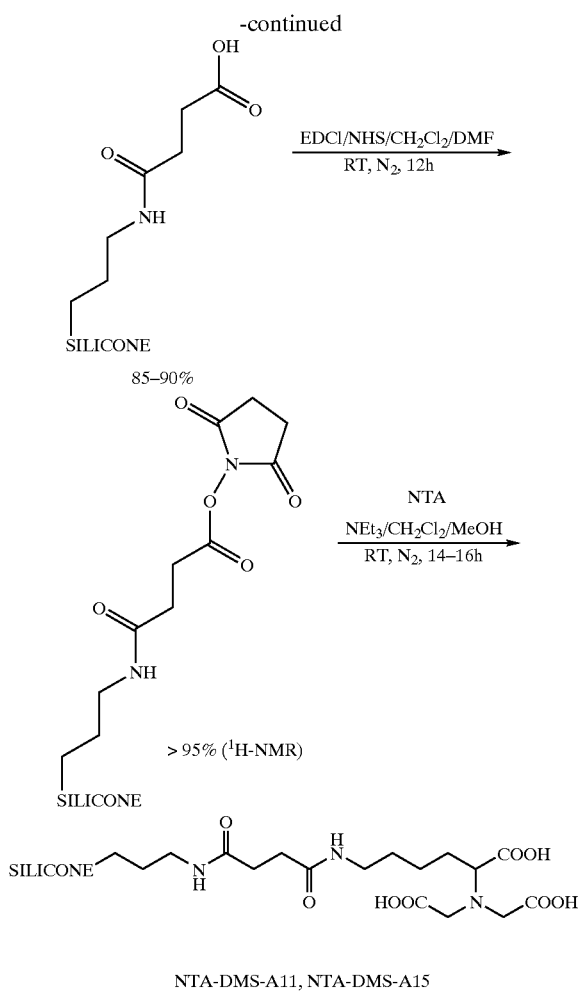

Properties of the Chelating Silicones

In order to test the ability of NTA-DMS-A11 to form complexes with metal cations, the chelating silicone was dissolved/dispersed in deionized water ($5\times10^{-4}$ M) and treated with $10^{-3}$ M solutions of $CuCl_2$, $FeCl_3$, and $CoCl_2$.

The solutions obtained were analyzed by electrospray-mass-spectroscopy (ES-MS). Ammonium hydroxide (1 drop of 0.1% $NH_4OH$ solution) was added and the data were recorded in negative ion mode. It is known that $Fe^{3+}$, $Co^{2+}$, and $Cu^{2+}$ form stable complexes with iminodiacetic acid type chelators (tridentate ligands) and EDTA (a pentadentate ligand for $Cu^{2+}$ and $Co^{2+}$, and a hexadentate ligand for $Fe^{3+}$) at pH values larger than 5. Under these conditions, it is also known that silicones undergo depolymerization. Thus, it was not surprising to observe the molecular ions of complexed fragments containing only one silicon-based residue: the highest molecular weight ions $[(Si-(CH_2)_3NCO(CH_2)_2CON-NTA-M^{n+})]$ were 529, 533, and 536, for $M^{n+}$= $Fe^{3+}$, $Co^{2+}$, and $Cu^{2+}$, respectively.

SPECIFIC EXAMPLES

Chemical Reagents $N^\epsilon$-Benzyloxycarbonyl-L-lysine (99%, Bachem), bromoacetic acid (97%, Aldrich), palladium on activated charcoal (Degussa type E101NE/W, wet/Pd 10% dry weight basis, water 50%, Aldrich), Celite (Aldrich), benzyl bromide (98%, Aldrich), cesium carbonate (99%, Aldrich), di-t-butyl pyrocarbonate (99%, Aldrich), anhydrous N,N-dimethylformamide (99.8%, Aldrich), trifluoroacetic acid (99+%, Aldrich), succinic anhydride (99%, Aldrich), N-hydroxysuccinimide (97%, Aldrich), 1-(3-dimethylaminopropyl)-3-ethylcarbodiimide hydrochloride (98%, Aldrich), 4-nitrobenzyl chloride (99%, Aldrich), hydrogen bromide (30% solution in acetic acid, Aldrich), allyl alcohol (99%, Aldrich), n-butyllithium (1.6 M solution in hexanes, Aldrich), chlorotrimethylsilane (redistilled, 99+%, Aldrich), dicumyl peroxide (98%, Aldrich), 1,1,1,3,3,3-hexamethyldisilazane (99.9%, Aldrich), platinum-divinyl-tetramethyldisiloxane complex (Karstedt's catalyst) in xylene (Gelest), and vinylmagnesium bromide (1.0 M solution in tetrahydrofuran, Aldrich), were used as received. Sodium bicarbonate, potassium hydroxide, and sodium hydroxide were obtained from BDH Chemicals. Acetic acid and hydrochloric acid were obtained from Fischer Scientific. The NMR solvents $D_2O$, $CDCl_3$, $CD_2Cl_2$, $CD_3OD$, and $CD_3CN$ were obtained from Cambridge Isotope Laborotories. Bio-Rad Laboratories supplied Bio-beads S-X1 (divinylbenzene crosslinked styrene). Toyopearl HW-40C gel filtration was supplied by Supelco (Sigma-Aldrich Canada Ltd.). Amino-functionalized silicones were purchased from Gelest Inc. (Table 1).

TABLE 1

Commercial Aminopropyl-Terminated Polydimethylsiloxanes
Aminopropylmethylsiloxane - Dimethylsiloxane Copolymers $$H_2N\diagup\diagdown\diagup Si-O-[Si-O]_n-Si\diagup\diagdown\diagup NH_2$$

| Code | Viscosity (cSt) | Molecular weight* | % Amine ($NH_2$) |
|---|---|---|---|
| Homopolymers | | | |
| DMS–A11 | 10–15 | 850–900 | 3.2–3.8 |
| DMS–A15 | 50–60 | 3000 | 1.0–1.2 |
| DMS–A21 | 100–120 | 5000 | 0.6–0.7 |
| Copolymers | | | |
| AMS–132 | 80–100 | 4500–5500 | 2–3 |
| AMS–152 | 150–260 | 7000–8000 | 4–5 |
| AMS–162 | 80–120 | 4000–5000 | 6–7 |

*Value provided by supplier; based on polystyrene standards.

Purification

Triethylamine (99%, Aldrich) was dried over KOH pellets, distilled and stored over molecular sieves (4 Å). Methylene chloride (98%, Aldrich) was distilled from calcium hydride. 1,1,1-Trichloroethane (reagent grade, Caledon) was filtered using a type HA 0.45 $\mu m$ Millipore filter. Chlorodimethylsilane (97%, Aldrich), chlorodimethylvinylsilane (97%, Gelest), and chlorotrimethylsilane (98%, Aldrich) were distilled under an inert (nitrogen) atmosphere and stored over molecular sieves. Diethyl ether (99.9%, Aldrich) was distilled over lithium aluminum hydride. Tetrahydrofuran (99%, Aldrich) was first distilled from lithium aluminum hydride and then from potassium/benzophenone. A Milli-Q purification system (Waters Associates, Millford, Mass.) was used to deionize and further purify distilled water.

General Procedures

All syntheses were carried out in dry apparatus under a dry nitrogen atmosphere utilizing conventional bench-top techniques.

Compound Characterization $^1$H NMR Fourier spectra were recorded on a Bruker DRX-500 (500 MHz) spectrometer, Bruker AC-300 (300 MHz) spectrometer or Bruker AC-200 (200 MHz) spectrometer. $^{13}$C and $^{29}$Si NMR were performed on a Bruker DRX-500 spectrometer (at 125.7 MHz and 99.3 MHz for carbon and silicon, respectively), a Bruker AC-200 spectrometer (at 50.3 MHz for carbon), and a Bruker AC-300 spectrometer (at 75.4 MHz and 59.60 MHz for carbon and silicon, respectively). Two dimensional $^1$H—, $^{13}$C—, and $^1$H-$^1$H chemical shift correlation experiments were recorded on a Bruker DRX-500 spectrometer. Chemical shifts for $^1$H NMR spectra are reported with respect to the following standards: residual chloroform set at 7.24 ppm, CDHCl$_2$ set at 5.32 ppm, CD$_2$HOD set at 3.30 ppm, the HDO peak at 4.67 ppm, and tetramethylsilane set at 0 ppm. $^{13}$C NMR spectra are reported with respect to the following standards: chloroform set at 77 ppm, methylene chloride set at 53.8 ppm, and tetramethylsilane set at 0 ppm. Chemical shifts for $^{29}$Si NMR spectra are reported with respect to tetramethylsilane set at 0 ppm. Coupling constants (j) are recorded in hertz (Hz). The abbreviations s=singlet, d=doublet, t=triplet, dd=doublet of doublets, m=multiplet, are used in reporting the spectra.

Mass spectrometry by chemical ionization (CI), with ammonia as the reagent gas (NH$_3$—CI), and electron impact (EI) mass spectra were recorded on a VG Analytical ZAB-E double focusing mass spectrometer. Low-resolution spectra were recorded for routine sample analysis of non-polar samples where appropriate. Typical experimental conditions were: mass resolution 1000, electron energy 70 eV, source temperature 200° C., source pressure of 2×10$^{-6}$ mbar for EI and 4×10$^{-5}$ mbar for CI. Mass spectra were reported as percent intensity (%) versus mass/charge (m/z) ratio.

Pneumatically-assisted electrospray ionization mass spectrometry ESMS was performed on a Micromass Quattro-LC Triple quadrupole mass spectrometer with dichloromethane, dichloromethane:methanol (50/50) or methanol as the mobile phase at a flow rate of 15 _L/min, with use of a Brownlee Microgradient syringe pump. Samples were dissolved in dichloromethane:methanol (50/50) or pure methanol. Ammonia or NH$_4$OAc was added for analysis in the negative mode; for analysis in the positive mode, formic acid was added.

Infrared spectra in the 4000–400 cm$^{-1}$ region were recorded on a BioRad FTS-40 Fourier transform spectrometer. Solid samples were prepared as KBr pellets (1–5% w/w). Ultraviolet spectra were recorded on a Hewlett-Packard 8451 diode array spectrometer.

The molecular weight distributions of oligomers, grafted products, and functional silicones were analyzed using a Waters Gel Permeation Chromatograph equipped with a Waters 410 Differential Refractive Index detector. Two Waters Styragel HR-4E (7.8×300 mm) columns in series were utilized with 1,1,1-trichloroethane as solvent flowing at 1 mL/min for functional silicone analysis. Narrow molecular weight polydimethylsiloxane standards (Polymer Laboratories) were used for calibration of the chromatographic system.

SYNTHETIC PROCEDURES

Preparation of NTA

N$^\alpha$,N$^\alpha$-bis(Carboxymethyl)-N$^\epsilon$-(benzyloxycarbonyl)-L-lysine [N-Z NTA]

Nε-(Benzyloxycarbonyl)-L-lysine (14.0 g, 0.05 mol) was dissolved in 2M NaOH (125 mL, 0.25 mol) with stirring, and cooled to 0° C. Bromoacetic acid (27.8 g, 0.2 mol) was added gradually with stirring and the pH of the solution was adjusted to 12.5–13.0 by the addition of NaOH. After 2 h the reaction mixture was warmed to room temperature and the reaction was allowed to continue overnight. Several pH adjustments were necessary in order to maintain a pH value above 12. The reaction mixture was heated to 50° C. for 4 h with stirring and pH adjustments to maintain a pH above 12. After cooling to room temperature, the product was precipitated from the solution by adding 1N HCl to pH 1.8, filtered, and dried overnight under high vacuum at 50° C. A white solid (18.85 g, 0.048 mol, 95%) was obtained (m.p. 171–174° C.).

$^1$H NMR (DMSO-d$_6$, 200 MHz) δ 9.19 (s, br, 3H, CO$_2$H), 7.33 (m, 5H, Ph), 7.24 (t, J=4.8 Hz, 1H, NH), 4.99 (s, 2H, PhCH$_2$), 3.46 (s, 4H, HO$_2$CCH$_2$), 3.32 (m, HO$_2$CCHCH$_2$), 2.95 (m, 2H, ZNHCH$_2$), 1.57 (m, 2H, HO$_2$CCHCH$_2$), 1.36 (m, 4H, ZNHCH$_2$CH$_2$CH$_2$); $^{13}$C NMR (D$_2$O: CD$_3$CN (1:1), 50.3 MHz) δ 175.4 (CO$_2$H), 175.1 (2×CO$_2$H), 158.4 (HNC=O), 138.0 (Ph), 129.6 (Ph), 129.1 (Ph), 128.8 (Ph), 67.2 (HO$_2$CCHCH$_2$), 66.6 (2×HO$_2$CCH$_2$), 55.5 (PhCH$_2$), 41.2 (ZNHCH$_2$), 30.0 (HO$_2$CCHCH$_2$), 29.7 (ZNHCH$_2$CH$_2$), 24.2 (ZNHCH$_2$CH$_2$CH$_2$); ESMS (-ve ion mode+1 drop 0.2% NH$_4$OH): m/z (% intensity), 395 (100) [M$^-$]; FT-IR (KBr): ν (cm$^{-1}$) 3377 (COO—H), 3024 (CH), 2942 (CH), 1728 (C=O), 1698 (N—C=O), 1536 (N—C=O).

N$^\alpha$,N$^\alpha$-bis(Carboxymethyl)-L-lysine [NTA]

N$^\epsilon$-Z NTA (9.35 g, 0.027 mol) was dissolved in 1N NaOH (60 mL, 0.06 mol), a spatula tip of 10% Pd/C was added, and hydrogenation was conducted at normal pressure and room temperature overnight. The catalyst was removed by vacuum filtration through a Celite pad. The clear colorless filtrate was acidified to pH 2 by dropwise addition of concentrated HCl, followed by the removal of solvent in vacuo. The crude solid obtained was triturated with hot methanol (3×250 mL). The solvent was removed in vacuo and the product was dried under vacuum at 50° C. overnight: yield 5.24 g (0.02 mol, 83.3%) white solid.

$^1$H NMR (CD$_3$OD: D$_2$O (1:1), 200.13 MHz) δ 3.84 (s, 5H, 2×CH$_2$CO$_2$H, CHCO$_2$H), 2.90 (t, 2H, J=6.9 Hz, H$_2$NCH$_2$), 1.82 (m, 2H, HO$_2$CCHCH$_2$), 1.56 (m, 4H, H$_2$NCH$_2$CH$_2$CH$_2$); $^{13}$C NMR (CD$_3$OD: D$_2$O (1:1), 50.32 MHz) δ 173.2 (CO$_2$H), 1714 (2×CO$_2$H), 68.8 (CHCO$_2$H), 56.3 (2×CH$_2$CO$_2$H), 40.2 (H$_2$NCH$_2$), 27.7 (CH$_2$), 27.5 (CH$_2$), 24.2 (CH$_2$); ESMS (-ve mode+1 drop 0.1% NH$_4$OH): m/z (% intensity), 261 (100) [M$^-$]; FT-IR (KBr): _ (cm$^{-1}$) 3561 (COO—H), 3005 (CH), 2963 (CH), 1734 (C=O), 1627 (C=O).

N$^\alpha$,N$^\alpha$-bis(Carboxymethyl)-N$^\epsilon$-(tert-butyloxycarbonyl)-L-lysine Cesium-salt [N-BOC NTA-Cs-Salt N$^\alpha$,N$^\alpha$-Bis(carboxymethyl)-L-lysine (4.15 g, 15.8 mmol) was added to a mixture of cesium carbonate (7.746 g, 23.8n mol), water (25 mL), and dioxane (25 mL). The solution was cooled to 0° C. and di-tert-butyl dicarbonate (3.457 g, 15.8 mmol) was added with stirring. The reaction was continued at room temperature for 45 min and the pH of the solution was maintained at a value of 8.5 by addition of small amounts of cesium carbonate. Complete disappearance of N$^\alpha$,N$^\alpha$-bis(carboxymethyl)-L-lysine was shown by TLC on silica-gel (95% EtOH:H$_2$O (7:3), ninhydrin). The organic solvent was removed in vacuo and the residual water was removed by lyophilization yielding the product as a white powder. The product (as a Cs-salt) was used in the next step without further purification. TLC in 95% EtOH:H$_2$O (7:3), ninhydrin: R$_{f(prod.)}$=0.40, R$_{f(start\ mat.)}$=0.25.

N$^\alpha$,N$^\alpha$-bis(Carboxymethyl)-N$^\epsilon$-(tert-butyloxycarbonyl)-L-lysine Tribenzyl Ester [N-BOC NTA-Bn-Ester]

Benzyl bromide (1.436 g, 1 mL, 8.4 mmol) was added to a stirred suspension of N$^\epsilon$-BOC NTA-Cs-salt (1.88 g, 2 mmol) in anhydrous DMF (50 mL). The reaction was continued at room temperature overnight under nitrogen atmosphere and vigorous stirring. The DMF was removed in vacuo (<1 mm Hg) at 45–50° C. The product was purified by silica gel chromatography with hexanes/ethyl acetate (80:20) as eluent. The solvents were removed in vacuo, yielding a pale yellow oil (0.563 g, 0.89 mmol, 44.5%). TLC in hexanes/ethyl acetate (80:20), ninhydrin: R$_f$=0.09.

$^1$H NMR (CDCl$_3$, 200.13 MHz) δ 7.25 (m, 16H, 3×Ph+NH), 5.01 (m, 6H, 3×CH$_2$Ph), 3.63 (s, 4H, 2×CH$_2$CO$_2$Bn), 3.39 (t, 1H, J=5.1 Hz, CHCO$_2$Bn), 2.94 (m, 2H, NHCH$_2$), 1.60 (m, 2H, NCH$_2$CH$_2$), 1,37 (s, 9H, BOC), 1.33 (m, 4H, CH$_2$CH$_2$CH); $^{13}$C NMR (CDCl$_3$, 50.32 MHz) δ 172.3 (CHCO$_2$Bn), 171.0 (2×CH$_2$CO$_2$Bn), 155.9 (NHC=O), 135.7 (Ph), 135.6 (2×Ph), 128.4 (Ph), 128.2 (Ph), 126.8 (Ph), 78.9 (CMe$_3$), 66.3 (2×CH$_2$Ph), 65.1 (NCH), 64.7 (CH$_2$Ph), 52.7 (2×NCH$_2$), 40.2 (NHCH$_2$), 30.0 CH$_2$), 29.4 (CH$_2$), 28.4 (3×CH$_3$), 23.0 (CH$_2$); ESMS (+ve mode+MeOH): m/z (% intensity), 633 (100%) [M$^+$].

N$^\alpha$,N$^\alpha$-bis(Carboxymethyl)-L-lysine Tribenzyl Ester [NTA-Bn-Ester]

N$^\alpha$,N$^\alpha$-Bis(carboxymethyl)-N$^\epsilon$-(tert-butyloxycarbonyl)-L-lysine tribenzyl ester (1.625 g, 2.6 mmol) in trifluoroacetic acid (20 mL) was stirred under a nitrogen atmosphere at room temperature. After 45 min the reaction was complete as shown by TLC on silica gel in hexanes/ethyl acetate (70:30) to (ninhydrin and UV detection). After solvent removal in vacuo (<1 mm Hg) a clear oil was obtained (1.68 g, 100% yield, product is the TFA salt), which was used in the next step without further purification. TLC in hexanes/ethyl acetate (70:30): R$_{f(start.\ mat.)}$=0.25, R$_{f(product)}$=0.00.

$^1$H NMR (CDCl$_3$, 200.13 MHz) δ 7.32 (m, 15H, Ph), 5.10 (m, 6H, 3×CH$_2$Ph), 3.59 (m, 4H, 2×NCH$_2$), 3.53 (m, 1H, NCH), 3.05 (m, 2H, H$_2$NCH$_2$), 1.75–1.43 (m, 6H, H$_2$NCH$_2$CH$_2$CH$_2$).

N$^\alpha$,N$^\alpha$-bis(Carboxymethyl)-N$^\epsilon$-succinyl-L-lysine Tribenzyl Ester [SUCC NTA-Bn-Ester]

Succinic anhydride (0.257 g, 2.6 mmol) was added to a stirred solution of N$^{\alpha,N\alpha}$-bis(carboxymethyl)-L-lysine tribenzyl ester TFA salt (1.68 g, 2.6 mmol) and triethylamine (2.5 mL) in dry methylene chloride (30 mL), under nitrogen atmosphere at room temperature. More triethylamine was added in order to maintain basic conditions (pH 8.5 on wet litmus paper). After 3.5 h the reaction was complete as shown by TLC on silica gel in methylene chloride/acetic acid (99.8:0.02), detected by UV-light and molybdenum reagent. The organic phase was washed with 1N HCl (80 mL) and brine (3×80 mL) and dried over anhydrous sodium sulfate. Solvent removal in vacuo yielded the product as a clear colorless oil (1.422 g, 2.25 mmol, 87.5%). TLC in CH$_2$Cl$_2$/AcOH (99.8:0.02): R$_{f(start\ mat.)}$=0.38, R$_{f(product)}$=0.13, R$_{f(succinic\ ann.)}$=0.90.

$^1$H NMR (CDCl$_3$, 200.13 MHz) δ 7.31 (m, 15H, 3×Ph), 6.39 (s, 1H, NH), 5.05 (m, 6H, CH$_2$Ph), 3.65 (s, 4H, 2×NCH$_2$), 3.47 (t, 1H, J=4.6 Hz, NCH), 3.17 (m, 2H, NHCH$_2$), 2.62 (m, 2H, HO$_2$CCH$_2$), 2.45 (m, 2H, HO$_2$CCH$_2$CH$_2$), 1.67 (m, 2H, NCHCH$_2$) 1.43 (m, 4H, NHCH$_2$CH$_2$CH$_2$); $^{13}$C NMR (CDCl$_3$, 50.32 MHz) δ 175.3 (C=O), 172.9 (C=O), 172.6 (C=O), 171.4 (2×BnOC=O), 135.6 (Ph), 135.5 (Ph), 128.5 (Ph), 128.3 (Ph), 128.2 (Ph), 128.1 (Ph), 66.5 (2×CH$_2$Ph), 66.4 (CH$_2$Ph), 64.1 (NCH), 52.9 (2×NCH$_2$), 39.4 (NHCH$_2$), 30.6 (CH$_2$), 30.3 (CH$_2$), 29.4 (CH$_2$), 27.7 (CH$_2$), 22.4 (CH$_2$); ES-MS (+ve mode in MeOH): m/z (% intensity), 633 (100) [M$^+$]; FT-IR (neat): _ (cm$^-$) 3369 (COO—H), 3036 (CH), 2950 (CH), 1737 (C=O), 1635 (N—C=O), 1554 (N—C=O).

N$^\alpha$,N$^\alpha$-bis(Carboxymethyl)-N$^\epsilon$-succinimidylsuccinyl-L-lysine Tribenzyl Ester [N$^\epsilon$-SSU NTA-Bn-Ester]

N-Hydroxysuccinimide (0.78 g, 6.7 mmol) in dry 1,2-dimethoxyethane (80 mL) was added to N$^\alpha$,N$^\alpha$-bis (carboxymethyl)-N$^\epsilon$-succinyl-L-lysine tribenzyl ester (4.234 g, 6.7 mmol) in dry methylene chloride (80 mL) under a nitrogen atmosphere. After cooling to 0° C., 1-ethyl-3-(3-dimethylaminopropyl)carbodiimide hydrochloride (1.311 g, 6.7 mmol) was added with stirring. After 4 h the solution was gradually warmed to room temperature and the reaction continued overnight. The solvents were removed in vacuo. Silica gel chromatography in hexanes/ethyl acetate (15:85) (UV and molybdenum reagent visualization) yielded the product as colorless oil (3.676 g, 5.8 mmol, 87%). TLC in hexanes:ethyl acetate (15:85): R$_{f(product)}$=0.13.

$^1$H NMR (CDCl$_3$, 200.13 MHz) δ 7.31 (m, 15H, 3×Ph), 6.09 (s, 1H, NH), 5.07 (m, 6H, CH$_2$Ph), 3.68 (s, 4H, 2×NCH$_2$), 3.47 (t, 1H, J=7.5 Hz, NCH), 3.17 (m, 2H, NHCH$_2$), 2.95 (t, 2H, J=7.3 Hz, NHS—O$_2$CCH$_2$), 2.74 (s, 4H, NHS), 2.55 (t, 2H, J=7.3 Hz, NHS—O$_2$CCH$_2$CH$_2$), 1.67 (m, 2H, NCHCH$_2$), 1.43 (m, 4H, NHCH$_2$CH$_2$CH$_2$); $^{13}$C NMR (CDCl$_3$, 50.32 MHz) δ 172.5 (C=O), 171.2 (2×C=O), 169.9 (C=O), 169.0 (2×BnOC=O), 168.2 (C=O), 135.6 (Ph), 135.5 (Ph), 128.5 (Ph), 128.3 (Ph), 128.1 (Ph), 66.4 (3×CH$_2$Ph), 64.2 (NCH), 52.8 (2×NCH$_2$), 39.1 (NHCH$_2$), 30.6 (CH$_2$), 29.4 (CH$_2$), 26.9 (CH$_2$), 25.5 (2×CH$_2$), 22.5 (CH$_2$); FT-IR (neat): ν (cm$^{-1}$) 3387 (COO—H), 3036 (CH), 2946 (CH), 1816 (C=O), 1786 (C=O), 1740 (C=O), 1674 (C=O), 1544 (N—C=O); ES-MS (+ve mode in MeOH): m/z (% intensity), 730 (100) [M$^+$].

Preparation of Chelating Silicones (Condensation and Deprotection) Terminal Chelators

Monocarboxylic Acids

Succinyl-Terminated Polydimethylsiloxane DMS-A11 [SUCC-DMS-A11]

Succinic anydride (1.6 g, 16 mmol) and aminopropyl terminated polydimethylsiloxane DMS-A11 (7.2 g, 8 mmol) were dissolved in 200 mL dry methylene chloride and triethylamine (10 mL) was added. The solution was stirred under nitrogen at room temperature overnight. The organic phase was washed with 1M HCl (2×150 mL) and water (4×150 mL). After drying over anhydrous sodium sulfate the solvent was removed in vacuo, yielding a pale yellow oil (8.36 g, 95%).

$^1$H-NMR (CDCl$_3$, 200.13 MHz) δ 3.17 (q, 4H, J=6.4 Hz, 2×SiOCH$_2$CH$_2$CH$_2$NH), 2.60 (m, 4H, 2×O=CCH$_2$), 2.50 (m, 4H, 2×O=CCH$_2$), 1.48 (m, 4H, 2×SiOCH$_2$CH$_2$), 0.48 (m, 4H, 2×SiOCH$_2$), 0.03 (m, ~65H, SiCH$_3$); $^{13}$C-NMR (CDCl$_3$, 50.32 MHz) δ 176.4 (2×O—C=O), 172.4 (2×NH—C=O), 42.7 (2×SiOCH$_2$CH$_2$CH$_2$NH), 30.7 (2×OC(O)CH$_2$), 29.9 (2×NC(O)CH$_2$), 23.3 (2×SiOCH$_2$CH$_2$), 15.3 (2×SiOCH$_2$), 1.0 (SiCH$_3$), 0.1 (SiCH$_3$); $^{29}$Si-NMR (CH$_2$Cl$_2$, 59.63 MHz, TMS ext. std): δ 7.23, −19.33, −21.31, −22.04; FT-IR (neat): ν (cm$^{-1}$) 3305 (COO—H), 2964 (CH), 1709 (C=O), 1651 (N—C=O), 1557 (N—C=O), 1261 (Si—CH$_3$), 1020 (Si—O), 802 (Si—CH$_3$); GPC: neg. signal (RI det.): M$_n$=1687, M$_w$=1908, PD=1.13; pos. signal (RI det.): M$_n$=543, M$_w$=562, PD=1.03.

Succinyl-Terminated Polydimethylsiloxane DMS-A15 [SUCC-DMS-A15]

Succinic anydride (2.11 g, 21 mmol) and aminopropyl-terminated polydimethylsiloxane DMS-A11 (30.0 g, 10 mmol) were dissolved in 700 mL dry methylene chloride under a nitrogen atmosphere and dry triethylamine (10 mL) was added. The solution was stirred under nitrogen at room temperature overnight. The organic phase was washed with 1M HCl (2×150 mL) and water (4×50 mL). After drying over anhydrous sodium sulfate the solvent was removed vacuo, yielding a pale yellow oil (30.78 g, 95%).

$^1$H-NMR (CDCl$_3$, 200.13 MHz) δ 3.22 (q, 4H, J=6.4 Hz, 2×SiCH$_2$CH$_2$CH$_2$NH), 2.67 (m, 4H, 2×O=CCH$_2$), 2.49 (m, 4H, 2×O=CCH$_2$), 1.52 (m, 4H, 2×SiCH$_2$CH$_2$), 0.50 (m, 4H, 2×SiCH$_2$), 0.05 (m, ~256H, SiCH$_3$); $^{13}$C-NMR (CDCl$_3$, 50.32 MHz) δ 172.4 (4×C=O), 42.7 (2×SiCH$_2$CH$_2$CH$_2$NH), 30.7 (2×OC(O)CH$_2$), 30.0 (2×NC(O)CH$_2$), 23.3 (2×SiCH$_2$CH$_2$), 15.3 (2×SiCH$_2$), 1.8 (SiCH$_3$), 1.0 (SiCH$_3$), 0.1 (SiCH$_3$); FT-IR (neat): ν (cm$^{-1}$) 3300 (COO—H), 2965 (CH), 1713 (C=O), 652 (N—C=O), 1557 (N—C=O), 1266 (Si—CH$_3$), 1005 (Si—O); ES-MS (−ve mode in H$_2$Cl$_2$/MeOH): doubly charged ion series with peaks from 297 [M$^{2-}$,n=2] to 261 [M$^{2-}$,n=28]; GPC: M$_n$=1185, M$_w$=3552, PD=3.0 (from $^1$H-NMR, MW=3,408, n=40–41, based on end-group analysis).

Succinyl-Terminated Polydimethylsiloxane DMS-A21 [SUCC-DMS-A21]

Succinic anydride (1.05 g, 10.5 mmol) and aminopropyl-terminated polydimethyl-siloxane DMS-A21 (25.0 g, 5 mmol) were dissolved in 700 mL dry methylene chloride under nitrogen atmosphere and dry triethylamine (7 mL) was added. The solution was stirred under nitrogen at room temperature overnight. The organic phase was washed with 1M HCl (2×110 mL) and deionized water (4×110 mL). After drying over anhydrous sodium sulfate the solvent was removed in vacuo, yielding a pale yellow oil (25.86 g, 4.97 mmol, 95 (%).

$^1$H-NMR (CDCl$_3$, 200.13 MHz) δ 3.23 (q, 4H, J=6.7 Hz, 2×SiCH$_2$CH$_2$CH$_2$NH), 2.68 (m, 4H, 2×O=CCH$_2$), 2.49 (m, 4H, 2×O=CCH$_2$), 1.52 (m, 4H, 2×SiCH$_2$CH$_2$), 0.51 (m, 4H, 2×SiCH$_2$), 0.05 (m, ~422H, SiCH$_3$); $^{13}$C-NMR (CDCl$_3$, 50.32 MHz) δ 175.3 (2×C=O), 172.4 (2×C=O), 42.8 (2×SiCH$_2$CH$_2$CH$_2$NH), 30.8 (2×OC(O)CH$_2$), 30.0 (2×NC(O)CH$_2$), 23.4 (2×SiCH$_2$CH$_2$), 15.4 (2×SiCH$_2$), 1.8 (SiCH$_3$), 1.0 (SiCH$_3$), 0.1 (SiCH$_3$); $^{29}$Si-NMR (CH$_2$Cl$_2$, 59.63 MHz, TMS ext. std): δ 7.16, −21.33, −21.47, −22.14; FT-IR (neat): ν (cm$^{-1}$) 3300 (COO—H), 2965 (CH), 1715 (C=O), 1651 (N—C=O), 1558 (N—C=O), 1261 (Si—CH$_3$), 1096 (Si—O), 1024 (Si—O), 801 (Si—CH$_3$); GPC: M$_n$=1369, M$_w$=5746, PD=4.19 (from $^1$H-NMR, MW=5,500, n=68–69, based on end-group analysis).

Tricarboxylic Acids

N$^{α,Nα}$-bis(Carboxymethyl)-L-lysine Tribenzyl Ester-terminated Polydimethylsiloxane DMS-A11 [NTA-DMS-A11-Bn-Ester]

Aminopropyl-terminated poly-dimethylsiloxane DMS-A11 (0.394 g, 0.45 mmol) was added to a stirred solution of N$^{α,Nα}$-bis(carboxymethyl)-N$^ε$-succinimidylsuccinyl-L-lysine tribenzyl ester (0.72 g, 1 mmol) in dry methylene chloride (40 mL) under a nitrogen atmosphere. After stirring for 5 h at room temperature the solvent was removed in vacuo. Silica gel chromatography using methylene chloride/methanol (97:3) yielded the product as a clear pale yellow solid (0.900 g, 0.43 mmol, 95%). TLC in CH$_2$Cl$_2$/MeOH (97:3): R$_{f(product)}$=0.14–0.40, R$_{f(NHS-OH)}$=0.04, R$_{f(DMS-A11)}$=0, R$_{f(NHS-ester\ start\ mat.)}$=058.

$^1$H NMR (CDCl$_3$, 200.13 MHz) δ 7.31 (m, 30H, 6×Ph), 6.20 (s, br, 4H, NH), 5.06 (m, 12H, CH$_2$Ph), 3.67 (s, 8H, 4×NCH$_2$), 3.47 (t, 2H, J=7.5 Hz, 2×NCH), 3.15 (m, 8H, 4×NHCH$_2$), 2.46 (s, 8H, 2×O=CCH$_2$CH$_2$C=O), 1.65 (m, 4H, 2×NCHCH$_2$), 1.43 (m, 12H, 2×SiCH$_2$CH$_2$, 2×NHCH$_2$CH$_2$CH$_2$), 0.49 (m, 4H, 2×SiCH$_2$), 0.04 (m, ~55H), SiCH$_3$); $^{13}$C NMR (CDCl$_3$, 50.32 MHz) δ 172.5 (C=O), 172.3 (C=O), 172.1 (C=O), 171.2 (C=O), 135.7 (Ph), 135.6 (Ph), 128.5 (Ph), 128.3 (Ph), 128.1 (Ph), 66.4 (6×CH$_2$Ph), 64.4 (2×NCH), 52.8 (4×NCH$_2$), 42.5 (2×NHCH$_2$), 39.2 (2×NHCH$_2$), 32.0 (2×CH$_2$), 3.18 (2×CH$_2$), 29.7 (2×CH$_2$), 28.4 (2×CH$_2$), 23.4 (2×CH$_2$), 22.8 (2×CH$_2$), 15.4 (2×CH$_2$), 1.2 (CH$_3$), 1.0 (CH$_3$), 0.3 (CH$_3$), 0.1 (CH$_3$); $^{29}$Si NMR (CH$_2$Cl$_2$, 59.63 MHz, TMS ext. std): δ 7.22, −20.9, −21.50, −22.10; ES-MS (+ve mode in MeOH+1 drop 0.1% HCOOH): singly charged ion series with peaks from 1478 [M$^+$,n=0] to 2364 [M$^+$,n=11]; doubly charged ion series with peaks from 739 [M$^{2+}$,n=0] to 1407 [M$^{2+}$,n=18]; FT-IR (neat): ν (cm$^{-1}$) 3301 (COO—H), 2962 (CH), 1743 (C=O), 1642 (N—C=O), 1549 (N—C=O), 1261 (Si—CH$_3$), 1091 (Si—O), 1028 (Si—O), 801 (Si—CH$_3$).

N$^α$,N$^α$-bis(Carboxymethyl)-L-lysine Terminated Polydimethylsiloxane DMS-A11 [NTA-DMS-A11]

N$^α$,N$^α$-Bis(carboxymethyl)-L-lysine tribenzyl ester-terminated polydimethylsiloxane DMS-A11 (0.506 g, 0.24 mmol) was dissolved in dry 1,2-dimethoxyethane (40 mL). 10% palladium on charcoal (a spatula tip) was added, and hydrogenation at room temperature and normal pressure was allowed to proceed for 8 h. The completion of the reaction was shown by the disappearance of the starting material as checked by TLC using methylene chloride/methanol (93:7). The catalyst was removed by filtration through a Celite pad and the solvent was removed in vacuo yielding the product as a pale yellow clear solid (0.370 g, 0.24 mmol, 100%).

$^1$H NMR (CD$_3$OD, 200.13 MHz) δ 3.64 (s, 8H, 4×NCH$_2$), 3.47 (t, 2H, J=6.8 Hz, 2×NCH), 3.15 (m, 8H, 4×NHCH$_2$), 2.45 (s, 8H, 2×O=CCH$_2$CH$_2$C=O), 1.70 (m, 4H, 2×NCHCH$_2$), 1.52 (m, 12H, 2×SiCH$_2$CH$_2$, 2×NHCH$_2$CH$_2$CH$_2$), 0.56 (m, 4H, 2×SiCH$_2$), 0.08 (m, ~60H, SiCH$_3$); $^{13}$C NMR (CD$_3$OD, 50.32 MHz) δ 175.8 (C=O), 174.6 (C=O), 66.6 (2×NCH), 55.3 (4×NCH$_2$), 43.6 (2×NHCH$_2$), 40.1 (2×NHCH$_2$×CH$_2$), 32.4 (4×CH$_2$), 30.7 (2×CH$_2$), 29.9 (2×CH$_2$), 24.7 (2×CH$_2$), 24.4 (2×CH$_2$), 16.4 (2×CH$_2$), 1.4 (CH$_3$), 0.3 (CH$_3$); ES-MS (−ve mode in CH$_2$Cl$_2$/MeOH+1 drop 0.25 mM NH$_4$OAc): singly charged ion series with peaks from 936 [M$^-$,n=0] to 2120 [M$^-$,n=16]; doubly charged ion series with peaks from 467 [M$^{2-}$,n=0] to 1209 [M$_{2-}$,n=20]; FT-IR (neat): ν (cm$^-$) 3297 (COO—H), 2963 (CH), 1730 (C=O), 1646 (N—C=O), 1553 (N—C=O), 1261 (Si—CH$_3$), 1090 (Si—O), 1029 (Si—O), 801 (Si—CH$_3$).

N$^α$,N$^α$-bis(Carboxymethyl)-L-lysine Tribenzyl Ester-terminated Polydimethyl-siloxane DMS-A15 [NTA-DMS-A15-Bn-Ester]

Aminopropyl-terminated poly-dimethylsiloxane DMS-A15 (1.340 g, 0.45 mmol) was added to a stirred solution of $N^\alpha,N^\alpha$-bis(carboxymethyl)-$N^\epsilon$-succinimidylsuccinyl-L-lysine tribenzyl ester (0.72 g, 1 mmol) in dry methylene chloride (40 mL) under a nitrogen atmosphere. After stirring for 5 h at room temperature a small amount of aminopropylmethylsiloxane-dimethylsiloxane copolymer AMS-162 (0.5 g) was added in order to react with excess NHS-activated starting material and the stirring was continued for 15 min. The solvent was removed in vacuo. Silica gel chromatography using methylene chloride/methanol (95:5) yielded the product as a clear pale yellow solid (1.136 g, 55%). TLC in $CH_2Cl_2$/MeOH (95:5): $R_{f(product)}$=0.08–0.24, $R_{f(NHS\text{-}OH)}$=0.02, $R_{f(DMS\text{-}A15)}$=0.00, $R_{f(AM\text{-}162\ NTA\text{-}ester)}$=0.00.

$^1$H NMR (CDCl$_3$, 200.13 MHz) δ 7.31 (m, 30H, 6×Ph), 6.21 (s, br, 4H, NH), 5.06 (m, 12H, CH$_2$Ph), 3.67 (s, 8H, 4×NCH$_2$), 3.47 (t, 2H, J=7.3 Hz, 2×NCH), 3.16 (m, 8H, 4×NHCH$_2$), 2.47 (s, 8H, 2×O=CCH$_2$CH$_2$C=O), 1.66 (m, 4H, 2×NCHCH$_2$) 1.46 (m, 12H, 2×SiCH$_2$CH$_2$, 2×NHCH$_2$CH$_2$CH$_2$), 0.50 (m, 4H, 2×SiCH$_2$), 0.06 (m, ~330H, SiCH$_3$); $^{13}$C NMR (CDCl$_3$, 50.32 MHz) δ 172.5 (C=O), 172.3 (C=O), 172.1 (C=O), 171.2 (C=O), 135.7 (Ph), 135.6 (Ph), 128.6 (Ph), 128.3 (Ph), 128.2 (Ph), 66.4 (6×CH$_2$Ph), 64.4 (2×NCH), 52.8 (4×NCH$_2$), 42.5 (2×NHCH$_2$), 39.2 (2×NHCH$_2$), 32.0 (2×CH$_2$), 31.8 (2×CH$_2$), 29.7 (2×CH$_2$), 28.4 (2×CH$_2$), 23.5 (2×CH$_2$), 22.8 (2×CH$_2$), 15.4 (2×CH$_2$), 1.7 (CH$_3$), 1.0 (CH$_3$), 0.3 (CH$_3$), 0.1 (CH$_3$); ES-MS (+ve mode+1 drop 0.2% HCOOH): doubly charged ion series with peaks from 1407 [M$^{2+}$,n=18] to 2291 [M$^{2+}$,n=41]; triply charged ion series with peaks from 1260 [M$^{3+}$,n=31] to 1851 [M$^{3+}$,n=55]; GPC: M$_n$=2137, M$_w$=2398, PD=1.12; FT-IR (neat): ν (cm$^{-1}$) 3299 (COO—H), 2964 (CH), 1746 (C=O), 1641 (N—C=O), 1550 (N—C=O), 1261 (Si—CH$_3$), 1092 (Si—O), 1021 (Si—O), 800 (Si—CH$_3$).

$N^{\alpha,N\alpha}$-bis(Carboxymethyl)-L-lysine-terminated Polydimethylsiloxane DMS-A15 [NTA-DMS-A15]

$N^\alpha,N^\alpha$-Bis(carboxymethyl)-L-lysine tribenzyl ester-terminated polydimethylsiloxane DMS-A15 (0.547 g, 0.12 mmol) was dissolved in dry 1,2-dimethoxyethane (25 mL), 10% palladium on charcoal (a spatula tip) was added, and hydrogenation at room temperature and normal pressure was allowed to proceed for 8 h. The completion of the reaction was shown by the disappearance of the starting material as checked by thin layer chromatography using methylene chloride/methanol (93:7). The catalyst was removed by filtration through a Celite pad and the solvent was removed in vacuo yielding the product as a pale yellow clear solid (0.397 g, 0.11 mmol, 95%).

$^1$H NMR (CD$_3$OD, 200.13 MHz) δ 3.62 (s, 8H, 4×NCH$_2$), 3.49 (t, 2H, J=7.0 Hz, 2×NCH), 3.13 (m, 8H, 4×NHCH$_2$), 2.69 (s, 8H, 2×O=CCH$_2$CH$_2$C=O), 1.76 (m, 4H, 2×NCHCH$_2$), 1.52 (m, 12H, 2×SiCH$_2$CH$_2$, 2×NHCH$_2$CH$_2$CH$_2$), 0.59 (m, 4H, 2×SiCH$_2$), 0.09 (m, ~360H, SiCH$_3$); $^{13}$C NMR (CD$_3$OD, 50.32 MHz) δ 175.8 (C=O), 174.6 (C=O), 66.6 (2×NCH), 55.3 (4×NCH$_2$), 43.6 (2×NHCH$_2$), 40.1 (2×NHCH$_2$), 32.5 (4×CH$_2$), 30.7 (2×CH$_2$), 29.9 (2×CH$_2$), 24.7 (2×CH$_2$), 24.4 (2×CH$_2$), 16.4 (2×CH$_2$), 1.5 (CH$_3$), 0.4 (CH$_3$); ES-MS (-ve mode in CH$_2$Cl$_2$/MeOH): doubly charged ion series lo with peaks from 1096 [M$^{2-}$,n=17] to 2392 [M$^{2-}$,n=52]; triply charged ion series with peaks from 756.5 [M$^{3-}$,n=18] to 1545 [M$^{3-}$,n=51]; FT-IR (neat): ν (cm$^{-1}$) 3290 (COO—H), 2964 (CH), 1729 (C=O), 1642 (N—C=O), 1261 (Si—CH$_3$), 1091 (Si—O), 1020 (Si—O), 800 (Si—CH$_3$).

$N^\alpha,N^\alpha$-bis(Carboxymethyl)-L-lysine Tribenzyl Ester-terminated Polydimethyl-siloxane DMS-A21 [NTA-DMS-A21-Bn-Ester]

Aminopropyl-terminated polydimethylsiloxane DMS-A21 (1.125 g, 0.23 mmol) was added to a stirred solution of $N^\alpha,N^\alpha$-bis(carboxymethyl)-$N^\epsilon$-succinimidylsuccinyl-L-lysine tribenzyl ester (0.365 g, 0.5 mmol) in dry methylene chloride (60 mL) under a nitrogen atmosphere. After stirring for 5 h at room temperature a small amount of aminopropylmethylsiloxane-dimethylsiloxane copolymer AMS-162 (0.5 g) was added in order to react with excess NHS-activated starting material and the stirring was continued for 15 min. The solvent is removed in vacuo. Silica gel chromatography using methylene chloride/methanol (95:5) yielded the product as a clear pale yellow solid (1.01 g, 0.16 mmol, 70%). TLC in $CH_2Cl_2$/MeOH (95:5): $R_{f(product)}$=0.07–0.29, $R_{f(NHS\text{-}OH)}$=0.02, $R_{f(DMS\text{-}A15)}$=0.00, $R_{f(AMS\text{-}162\ NTA\text{-}Bn\text{-}ester)}$=0.00.

$^1$H NMR (CDCl$_3$, 200.13 MHz) δ 7.30 (m, 30H, 6×Ph), 6.15 (s, br, 4H, NH), 5.07 (m, 12H, CH$_2$Ph), 3.67 (s, 8H, 4×NCH$_2$), 3.45 (t, 2H, J=7.1 Hz, 2×NCH), 3.16 (m, 8H, 4×NHCH$_2$), 2.47 (s, 8H, 2×O=CCH$_2$CH$_2$C=O), 1.66 (m, 4H, 2×NCHCH$_2$), 1.44 (m, 12H, 2×SiCH$_2$CH$_2$, 2×NHCH$_2$CH$_2$CH$_2$), 0.50 (m, 4H, 2×SiCH$_2$), 0.06 (m, ~490H, SiCH$_3$); $^{13}$C NMR (CDCl$_3$, 50.32 MHz) δ 172.5 (C=O), 172.3 (C=O), 171.2 (C=O), 135.7 (Ph), 135.6 (Ph), 128.6 (Ph), 128.3 (Ph), 128.1 (Ph), 66.4 (6×CH$_2$Ph), 64.4 (2×NCH), 52.8 (4×NCH$_2$), 42.6 (2×NHCH$_2$), 39.2 (2×NHCH$_2$), 31.7 (4×CH$_2$), 29.7 (2×CH$_2$), 28.3 (2×CH$_2$), 23.4 (2×CH$_2$), 22.8 (2×CH$_2$), 15.4 (2×CH$_2$), 1.7 (CH$_3$), 1.0 (CH$_3$), 0.3 (CH$_3$), 0.1 (CH$_3$); $^{29}$Si NMR (CH$_2$Cl$_2$, 59.63 MHz, TMS ext. std): δ 7.10, −19.19, −22.03, −22.76; ES-MS (+ve mode in MeOH+1 drop 0.2% HCOOH): doubly charged ion series with peaks from 1407 [M$^{2+}$,n=18] to 2291 [M$^+$,n=41]; triply charged ion series with peaks from 1260 [M$^{3+}$,n=31] to 1851 [M$^{3+}$,n=55]; GPC: M$_n$=1922, M$_w$=2813, PD=1.46; FT-IR (neat): ν (cm$^{-1}$) 3299 (COO—H), 2964 (CH), 1746 (C=O), 1642 (N—C=O), 1550 (N—C=O), 1261 (Si—CH$_3$), 1092 (Si—O), 1021 (Si—O), 801 (Si—CH$_3$).

$N^\alpha,N^\alpha$-bis(Carboxymethyl)-L-lysine-terminated Polydimethylsiloxane DMS-A21 [NTA-DMS-A21]

$N^\alpha,N^\alpha$-Bis(carboxymethyl)-L-lysine tribenzyl ester-terminated polydimethylsiloxane DMS-A15 (1.01 g, 0.16 mmol) was dissolved in dry 1,2-dimethoxyethane (25 mL), 10% palladium on charcoal (a spatula tip) was added, and hydrogenation at room temperature and normal pressure was allowed to proceed for 8 h. The completion of the reaction was shown by the disappearance of the starting material as checked by thin layer chromatography using methylene chloride/methanol (93:7). The catalyst was removed by filtration through a Celite pad and the solvent was removed in vacuo yielding the product as a pale yellow clear solid (0.832 g, 0.15 mmol, 93%).

$^1$H NMR (CDCl$_3$/CD$_3$OD (1:1), 200.13 MHz) δ 3.64 (s, 8H, 4×NCH$_2$), 3.48 (m, 2H, 2×NCH), 3.14 (m, 8H, 4×NHCH$_2$), 2.44 (s, 8H, 2×O=CCH$_2$CH$_2$C=O), 1.68 (m, 4H, 2×NCHCH$_2$), 1.49 (m, 12H, 2×SiCH$_2$CH$_2$, 2×NHCH$_2$CH$_2$CH$_2$), 0.52 (m, 4H, 2×SiCH$_2$), 0.06 (m, ~490H, SiCH$_3$); $^{13}$C NMR (CDCl$_3$/CD$_3$OD (1:1), 50.32 MHz δ 174.6 (C=O), 173.2 (C=O), 66.6 (2×NCH), 52.5 (4×NCH$_2$), 41.6 (2×NHCH$_2$), 38.1 (2×NHCH$_2$), 30.7 (2×CH$_2$), 28.8 (2×CH$_2$), 28.5 (2×CH$_2$), 27.8 (CH$_2$), 22.4 (2×CH$_2$), 22.2 (2×CH$_2$), 14.5 (2×CH$_2$), −0.1 (CH$_3$), −1.2 (CH$_3$), −3.0 (CH$_3$); ES-MS (-ve mode in CH$_2$Cl$_2$/MeOH): doubly charged ion series with peaks from 1096 [M$^{2-}$,n=17] to 249 [M$^{2-}$,n=48]; FT-IR (neat): ν (cm$^{-1}$) 3300 (COO—H), 2963 (CH), 1730 (C=O), 1643 N—C=O), 1549 (N—C=O), 1261 (Si—CH$_3$), 1091 (Si—O), 1020 (Si—O), 798 (Si—CH$_3$).

Pendant Chelating Silicones

Monocarboxylic Acids

Succinyl-Pendant Polydimethylsiloxane AMS-132 [SUCC-AMS-132]

Succinic anydride (1.34 g, 13.4 mmol) and aminopropylmethylsiloxane-dimethylsiloxane copolymer AMS-132 (30.0 g, 6.7 mmol, 13.4 meq $NH_2$) were dissolved in 700 mL dry methylene chloride under a nitrogen atmosphere and dry triethylamine (9.6 mL) was added. The solution was stirred under nitrogen at room temperature overnight. The organic phase was washed with 1M HCl (2×50 mL) and deionized water (4×90 mL). After drying over anhydrous sodium sulfate, the solvent was removed in vacuo, yielding a pale yellow oil (26.85 g, 5.8 mmol, 86%).

$^1$H-NMR (CDCl$_3$, 200.13 MHz) δ 3.23 (q, 4H, J=6.7 Hz, 2×SiCH$_2$CH$_2$CH$_2$NH), 2.64 (m, 4H, 2×O=CCH$_2$), 2.50 (m, 4H, 2×O=CCH$_2$), 1.52 (m, 4H, 2×SiCH$_2$CH$_2$), 0.51 (m, 4H, 2×SiCH$_2$), 0.05 (m, ~364H, SiCH$_3$); $^{29}$Si-NMR (CH$_2$Cl$_2$, 59.63 MHz, TMS ext. std): δ 6.99, −19.41, −21.65, −21.82, −22.13, −22.45; FT-IR (neat): ν (cm$^{-1}$) 3300 (COO—H), 2965 (CH), 1716 (C=O), 1648 (N—C=O), 1261 (Si—CH$_3$), 1090 (Si—O), 1021 (Si—O), 801 (Si—CH$_3$); GPC: M$_n$=1348, M$_w$=5101, PD=1.62 (from $^1$H-NMR, MW=7,700, n=95, m=1.63, calculated for 2.5% NH$_2$).

Succinyl-Pendant Polydimethylsiloxane AMS-152 [SUCC-AMS-152]

Succinic anydride (2.25 g, 22.5 mmol) and aminopropylmethylsiloxane-dimethylsiloxane copolymer AMS-152 (35.0 g, 5 mmol, 22.5 meq NH$_2$) were dissolved in 700 m.L dry methylene chloride under a nitrogen atmosphere and dry triethylamine (16.7 mL) was added. The solution was stirred under nitrogen at room temperature overnight. The organic phase was washed with 1M HCl (2×90 mL) and deionized water (4×150 mL). After drying over anhydrous sodium sulfate, the solvent was removed in vacuo, to yield a pale yellow oil (24.69 g, 3.32 mmol, 66%).

$^1$H-NMR (CDCl$_3$, 200.13 MHz) δ 3.20 (m, 4H, 2×SiCH$_2$CH$_2$CH$_2$NH), 2.63 (m, 4H, 2×O=CCH$_2$), 2.48 (m, 4H, 2×O=CCH$_2$), 1.52 (m, 4H, 2×SiCH$_2$CH$_2$), 0.48 (m, 4H, 2×SiCH$_2$), 0.05 (m, ~163H, SiCH$_3$); $^{13}$C-NMR (CDCl$_3$, 50.32 MHz) δ 176.4 (2×C=O), 172.4 (2×C=O), 42.5 (2×SiCH$_2$CH$_2$CH$_2$NH), 30.7 (2×OC(O)CH$_2$), 2×NC(O)CH$_2$), 23.0 (2×SiCH$_2$CH$_2$), 14.5 (2×SiCH$_2$), 1.8 (SiCH$_3$), 1.0 (SiCH$_3$), 0.3 (SiCH$_3$), −0.5 (SiCH$_3$); $^{29}$Si-NMR (CH$_2$Cl$_2$, 59.63 MHz, TMS ext. std): δ 6.97, −19.44, −21.68, −22.16, −22.86; FT-IR (neat): ν (cm$^{-1}$) 3304 (COO—H), 2965 (CH), 1715 (C=O), 1654 (N—C=O), 1558 (N—C=O), 1262 (Si—CH$_3$), 1094 (Si—O), 1022 (Si—O), 801 (Si—CH$_3$); GPC: M$_n$=1200, M$_w$=3162, PD=2.63 (from $^1$H-NMR, MW=10,600, n=116, m=4.5, calculated for 4.5% NH$_2$).

Succinyl-Pendant Polydimethylsiloxane AMS-162 [SUCC-AMS-162]

Succinic anydride (2.71 g, 27 mmol) and aminopropylmethylsiloxane-dimethylsiloxane copolymer AMS-162 (30.0 g, 7.5 mmol, 27 meq NH$_2$) were dissolved in 700 mL dry methylene chloride under a nitrogen atmosphere and dry triethylamine (18.1 mL) was added. The solution was stirred under nitrogen at room temperature overnight. The organic phase was washed with 1M HCl (2×100 mL) and deionized water (4×160 mL). After drying over anhydrous sodium sulfate, the solvent was removed in vacuo, to yield a pale yellow oil (22.73 g, 5.21 mmol, 70%).

$^1$H-NMR (CDCl$_3$, 200.13 MHz) δ 3.20 (m, 4H, 2×SiCH$_2$CH$_2$CH$_2$NH), 2.63 (m, 4H, 2×O=CCH$_2$), 2.49 (m, 4H, 2×O=CCH$_2$), 1.53 (m, 4H, 2×SiCH$_2$CH$_2$), 0.48 (m, 4H, 2×SiCH$_2$), 0.05 (m, ~82H, SiCH$_3$); $^{13}$C-NMR (CDCl$_3$, 50.32 MHz) δ 176.2 (2×C=O), 172.5 (2×C=O), 42.5 (2×SiCH$_2$CH$_2$CH$_2$NH), 30.7 (2×OC(O)CH$_2$), 3.00 (2×NC(O)CH$_2$), 23.0 (2×SiCH$_2$CH$_2$), 14.5 (2×SiCH$_2$), 1.7 (SiCH$_3$), 1.0 (SiCH$_3$), 0.3 (SiCH$_3$), −0.6 (SiCH$_3$); $^{29}$Si-NMR (CH$_2$Cl$_2$, 59.63 MHz, TMS ext. std): δ 6.98, −19.42, −21.66, −22.15, −22.52; FT-IR (neat): ν (cm$^{-1}$) 3310 (COO—H), 2959 (CH), 1711 (C=O), 1654 (N—C=O), 1553 (N—C=O), 1261 (Si—CH$_3$), 1091 (Si—O), 1021 (Si—O), 801 (Si—CH$_3$); GPC: M$_n$=785, M$_w$=1709, PD=2.18 (from $^1$H-NMR, MW=5,100, n=44–45, m=3.7, calculated for 6.5% NH$_2$).

Tricarboxylic Acids

N$^α$,N$^α$-bis(carboxymethyl)-L-lysine Tribenzyl Ester Pendant Polydimethyl-siloxane AMS-132 [NTA-AMS-132-Bn-Ester]

Aminopropylmethylsiloxane-dimethylsiloxane copolymer AMS-132 (1.377 g, 0.28 mmol, 0.46 meq NH$_2$) was added to a stirred solution of N$^α$,N$^α$-bis(carboxymethyl)-N$^ε$-succinimidylsuccinyl-L-lysine tribenzyl ester (0.403 g, 0.55 mmol) in dry methylene chloride (50 mL) under a nitrogen atmosphere. After stirring for 5 h at room temperature a small amount of aminopropylmethylsiloxane-dimethylsiloxane copolymer AMS-162 (0.2 g) was added in order to react with excess NHS-activated starting material and the stirring was continued for 15 min. The solvent was removed in vacuo. Silica gel chromatography using methylene chloride/methanol (95:5) yielded the product as a clear pale yellow solid (0.783 g, 0.15 mmol, 54%). TLC in CH$_2$Cl$_2$/MeOH (95:5): R$_{f(product)}$=0.10–0.22, R$_{f(AMS-132)}$=0.

$^1$H NMR (CDCl$_3$, 200.13 MHz) δ 7.30 (m, 15H, 3×Ph), 6.10 (s, br, 2H, NH), 5.06 (m, 6H, CH$_2$Ph), 3.67 (s, 4H, 2×NCH$_2$), 3.44 (t, 1H, J=6.9 Hz, NCH), 3.19 (m, 4H, 2×NHCH$_2$), 2.46 (s, 4H, O=CCH$_2$CH$_2$C=O), 1.65 (m, 2H, NCHCH$_2$) 1.40 (m, 6H, SiCH$_2$CH$_2$, NHCH$_2$CH$_2$CH$_2$), 0.47 (m, 2H, SiCH$_2$), 0.05 (m, ~205H, SiCH$_3$); $^{13}$C NMR (CDCl$_3$, 50.32 MHz) δ 172.5 (C=O), 171.2 (C=O), 135.7 (Ph), 128.6 (Ph), 128.3 (Ph), 128.2 (Ph), 66.4 (3×CH$_2$Ph), 64.5 (NCH), 52.8 (2×NCH$_2$), 42.4 (NHCH$_2$), 39.2 (NHCH$_2$), 31.8 (2×CH$_2$), 29.7 (CH$_2$), 28.4 (CH$_2$), 23.5 (CH$_2$), 22.8 (CH$_2$), 15.4 (CH$_2$), 1.7 (CH$_3$), 1.0 (CH$_3$), 0.3 (CH$_3$); GPC: M$_n$=3311, M$_w$=5566, PD=1.68 (from $^1$H NMR, MW=5251, n=53, m=1.63, calculated for 2.5% NH$_2$); FT-IR (neat): ν (cm$^{-1}$) 3300 (COO—H), 2965 (CH), 1747 (C=O), 1642 (N—C=O), 1550 (N—C=O), 1262 (Si—CH$_3$), 1091 (Si—O), 1021 (Si—O), 801 (Si—CH$_3$).

N$^α$,N$^α$-bis(Carboxymethyl)-L-lysine Pendant Polydimethylsiloxane AMS-132 [NTA-AMS-132]

N$^α$,N$^α$-Bis(carboxymethyl)-L-lysine tribenzyl ester pendant polydimethylsiloxane AMS-132 (0.783 g, 0.15 mmol) was dissolved in dry 1,2-dimethoxyethane (25 mL), 10% palladium on charcoal (a spatula tip) was added, and hydrogenation at room temperature and normal pressure was allowed to proceed for 8 h. The completion of the reaction was shown by the disappearance of the starting material as checked by TLC using methylene chloride/methanol (93:7). The catalyst was removed by filtration through a Celite pad. A thick gel-like material separated upon solvent removal in vacuo. This gel was dissolved in methylene chloride (20 mL) and water (20 mL) was added to this solution with stirring. The product precipitated upon methylene chloride removal in vacuo. The precipitation was repeated with 20 mL CH$_2$Cl$_2$ and 20 mL water. After drying in vacuo (<0.1 mm Hg) the final product was obtained as a white solid (0.332 g, 0.07 mmol, 47%).

$^1$H NMR (CDCl$_3$/CD$_3$OD (1:1), 200.13 MHz) δ 3.59 (m, 4H, 2×NCH$_2$), 3.48 (m, 1H, NCH), 3.13 (m, 4H,

2×NHCH$_2$), 2.45 (s, 4H, O=CCH$_2$CH$_2$C=O), 1.70–1.40 (m, 8H, NCHCH$_2$+SiCH$_2$CH$_2$+NHCH$_2$CH$_2$CH$_2$), 0.53 (m, 2H, SiCH$_2$), 0.04 (m, ~367H, SiCH$_3$); $^{13}$C NMR (CDCl$_3$/CD$_3$OD (1:1), 50.32 MHz) δ 173.8 (C=O), 172.3 (C=O), 64.6 (NCH), 53.4 (2×NCH$_2$), 41.3 (NHCH$_2$), 38.0 (NHCH$_2$), 30.3 (2×CH$_2$), 28.5 (2×CH$_2$), 27.7 (CH$_2$), 22.1 (CH$_2$), 13.6 (CH$_2$), −0.2 (CH$_3$), −0.5 (CH$_3$); FT-IR (neat): ν (cm$^{-1}$) 3337 (COO—H), 2964 (CH), 1728 (C=O), 1644 (N—C=O), 1261 (Si—CH$_3$), 1092 (Si—O), 1021 (Si—O), 800 (Si—CH$_3$) (from $^1$H NMR, MW=4838, n=53, m=1.63, calculated for 2.5% NH$_2$).

N$^\alpha$,N$^\alpha$-bis(Carboxymethyl)-L-lysine Tribenzyl Ester Pendant Polydimethylsiloxane AMS-152 [NTA-AMS-152-Bn-Ester]

Aminopropylmethyl-siloxane-dimethylsiloxane copolymer AMS-152 (1.233 g, 0.16 mmol, 0.72 meq NH$_2$) was added to a stirred solution of N$^\alpha$,N$^\alpha$-bis(carboxymethyl)-N$^\epsilon$-succinimidylsuccinyl-L-lysine tribenzyl ester (0.584 g, 0.8 mmol) in dry methylene chloride (50 mL) under a nitrogen atmosphere. After stirring for 5 h at room temperature a small amount of aminopropylmethylsiloxane-dimethylsiloxane copolymer AMS-162 (0.2 g) was added in order to react with excess NHS-activated starting material and the stirring was continued for 15 min. The solvent was removed in vacuo. Silica gel chromatography using methylene chloride/methanol (95:5) yielded the product as a clear pale yellow solid (0.604 g, 0.06 mmol, 37%). TLC in CH$_2$Cl$_2$/MeOH (95:5): R$_{f(product)}$=0.08–0.25, R$_{f(AMS-132)}$=0.

$^1$H NMR (CDCl$_3$, 200.13 MHz) δ 7.30 (m, 15H, 3×Ph), 6.12 (s, br, 2H, NH), 5.06 (m, 6H, CH$_2$Ph), 3.67 (s, 4H, 2×NCH$_2$), 3.44 (t, 1H, J=7.4 Hz, NCH), 3.15 (m, 4H, 2×NHCH$_2$), 2.46 (s, 4H, O=CCH$_2$CH$_2$C=O), 1.64 (m, 2H, NCHCH$_2$), 1.40 (m, 6H, SiCH$_2$CH$_2$, NHCH$_2$CH$_2$CH$_2$), 0.47 (m, 2H, SiCH$_2$), 0.05 (m, ~175H, SiCH$_3$); $^{13}$C NMR (CDCl$_3$, 50.32 MHz) δ 172.5 (C=O), 171.2 (C=O), 135.7 (Ph), 128.6 (Ph), 128.3 (Ph), 128.2 (Ph), 66.4 (3×CH$_2$Ph), 64.5 (NCH), 52.8 (2×NCH$_2$), 42.4 (NHCH$_2$), 39.2 (NHCH$_2$), 31.9 (2×CH$_2$), 29.7 (CH$_2$), 28.4 (CH$_2$), 23.2 (CH$_2$), 22.8 (CH$_2$), 14.7 (CH$_2$), 1.8 (CH$_3$), 1.0 (CH$_3$), 0.3 (CH$_3$); FT-IR (neat): ν (cm$^{-1}$) 3301 (COO—H), 2965 (CH), 1747 (C=O), 1642 (N—C=O), 1550 (N—C=O), 1261 (Si—CH$_3$), 1091 (Si—O), 1019 (Si—O), 801 (Si—CH$_3$); GPC: M$_n$=3487, M$_w$=5082, PD=1.45 (from $^1$H NMR, MW=12,300, n=121, m=4.35, calculated for 4.5% NH$_2$).

N$^\alpha$,N$^\alpha$-bis(Carboxymethyl)-L-lysine Pendant Polydimethylsiloxane AMS-152 [NTA-AMS-152]

AMS-152 (0.6 g, 0.06 mmol) was dissolved in dry 1,2-dimethoxyethane (25 mL), 10% palladium on charcoal (a spatula tip) was added, and hydrogenation at room temperature and normal pressure was allowed to proceed for 8 h. The completion of the reaction was shown by the disappearance of the starting material as checked by TLC using methylene chloride/methanol (93:7). The catalyst was removed by filtration through a Celite pad. A thick gel-like material separated upon solvent removal in vacuo. This gel was dissolved in methylene chloride (20 mL) and water (20 mL) was added to this solution with stirring. The product precipitated upon methylene chloride removal in vacuo. The precipitation was repeated with 20 mL CH$_2$Cl$_2$ and 20 mL water. After drying in vacuo (<0.1 mm Hg) the final product was obtained as a white solid (0.16 g, 0.02 mmol, 33%).

$^1$H NMR (CD$_3$OD, 500.13 MHz) δ 3.61 (m, 4H, 2×NCH$_2$), 3.46 (m, 1H, NCH), 14 (m, 4H, 2×NHCH$_2$), 2.45 (s, 4H, O=CCH$_2$CH$_2$C=O), 1.70–1.50 (m, 8H), CHCH$_2$+ SiCH$_2$CH$_2$+NHCH$_2$CH$_2$CH$_2$), 0.54 (m, 2H, SiCH$_2$), 0.09 (m, ~120H, SiCH$_3$); $^{13}$C NMR (CD$_3$OD, 125.76 MHz) δ 175.9 (C=O), 174.6 (C=O), 66.8 (NCH), 55.6 (NCH$_2$), 54.8 (NCH), 43.5 (NHCH$_2$), 40.1 (NHCH$_2$), 32.5 (CH$_2$), 30.7 (CH$_2$), 29.9 (CH$_2$), 28.0 (2×CH$_2$), 24.3 (CH$_2$), 15.8 (CH$_2$), 2.0 (CH$_3$), 1.5 (CH$_3$); FT-IR (neat) ν (cm$^{-1}$) 3303 (COO—H), 2963 (CH), 1737 (C=O), 1644 (N—C=O), 1568 (N—C=O), 1262 (Si—CH$_3$), 1098 (Si—O), 1023 (Si—O), 808 (Si—CH$_3$) (from $^1$H NMR, MW=8400, n=85, m=4.35, calculated for 4.5% NH$_2$).

N$^\alpha$,N$^\alpha$-bis(Carboxymethyl)-L-lysine Tribenzyl Ester Pendant-polydimethylsiloxane MS-162 [NTA-AMS-162-Bn-Ester]

Aminopropylmethyl-siloxane-dimethyl-siloxane copolymer AMS-162 (1.1 g, 0.24 mmol, 0.9 meq NH$_2$) was added to a stirred solution of N$^\alpha$,N$^\alpha$-bis(carboxymethyl)-N$^\epsilon$-succinimidylsuccinyl-L-lysine tribenzyl ester (0.66 g, 0.9 mmol) in dry methylene chloride (50 mL) under a nitrogen atmosphere. After stirring for 5 h at room temperature the solvent was removed in vacuo. Silica gel chromatography using methylene chloride/methanol (95:5) yielded the product as a clear pale yellow solid (1.2 g, 0.18 mmol, 74%).

$^1$H NMR (CDCl$_3$, 200.13 MHz) δ 7.30 (m, 15H, 3×Ph), 6.11 (s, br, 2H, NH), 5.06 (m, 6H, CH$_2$Ph), 3.67 (s, 4H, 2×NCH$_2$), 3.44 (t, 1H, J=7.5 Hz, NCH), 3.18 (m, 4H, 2×NHCH$_2$), 2.46 (s, 4H, O=CCH$_2$CH$_2$C=O), 1.66 (m, 2H, NCHCH$_2$) 1.44 (m, 6H, SiCH$_2$CH$_2$, NHCH$_2$CH$_2$CH$_2$), 0.48 (m, 2H, SiCH$_2$), 0.05 (m, ~86H, SiCH$_3$); $^{13}$C NMR (CDCl$_3$, 50.32 MHz) δ 172.5 (C=O), 172.2 (C=O), 172.1 (C=O), 171.2 (C=O), 135.7 (Ph), 135.6 (Ph), 128.5 (Ph), 128.3 (Ph), 128.2 (Ph), 66.4 (3×CH$_2$Ph), 64.5 (NCH), 52.8 (2×NCH$_2$), 42.4 (NHCH$_2$), 39.2 (NHCH$_2$), 31.9 (CH$_2$), 31.7 (CH$_2$), 29.7 (CH$_2$), (CH$_2$), 28.5 (CH$_2$), 23.2 (CH$_2$), 22.8 (CH$_2$), 14.7 (CH$_2$), 1.8 (CH$_3$), 1.0 (CH$_3$), 0.5 (CH$_3$), −0.6 (CH3); FT-IR (neat): ν (cm$^{-1}$) 3299 (COO—H), 2963 (CH), 1746 (C=O), 1642 (N—C=O), 1550 (N—C=O), 1261 (Si—CH$_3$), 1091 (Si—O), 1021 (Si—O), 801 (Si—CH$_3$); GPC: M$_n$=2143, M$_w$=4178; PD=1.95 (from $^1$H NMR, MW=5,900, n=47, m=3.7, calculated for 6.5% NH$_2$).

Surface Pressure Analysis

Films of the prepared chelating silicones were examined for their surface behavior using a Langmuir trough. The films were formed by spreading a very small amount of the compound from a chloroform/methanol solution (9:1) onto (subphase) liquids that included deionized water, NaHCO$_3$ @ pH 8, 10$^{-4}$ M NiCl$_2$ in deionized water and 10$^{-4}$ M CaCl$_2$ in NaHCO$_3$ @ pH 8.

The surface pressure is equal to the difference between the surface tension of the pure liquid surface and the one covered with a film, and may be represented by as:

$$\pi = \gamma_0 - \gamma,$$

where γ$_0$ is the surface tension of the pure liquid and γ is the tension of the film-covered surface.

Three pressures characterize the stability of a monolayer with respect to its own bulk phase: the collapse pressure (the highest pressure to which a monolayer can be compressed without detectable expulsion of molecules to form a new phase), the equilibrium spreading pressure (where the monolayer is in equilibrium with the stable liquid bulk phase), and the monolayer stability limit (maximum pressure attainable in the film without the possibility of collapse).

Figure 2:
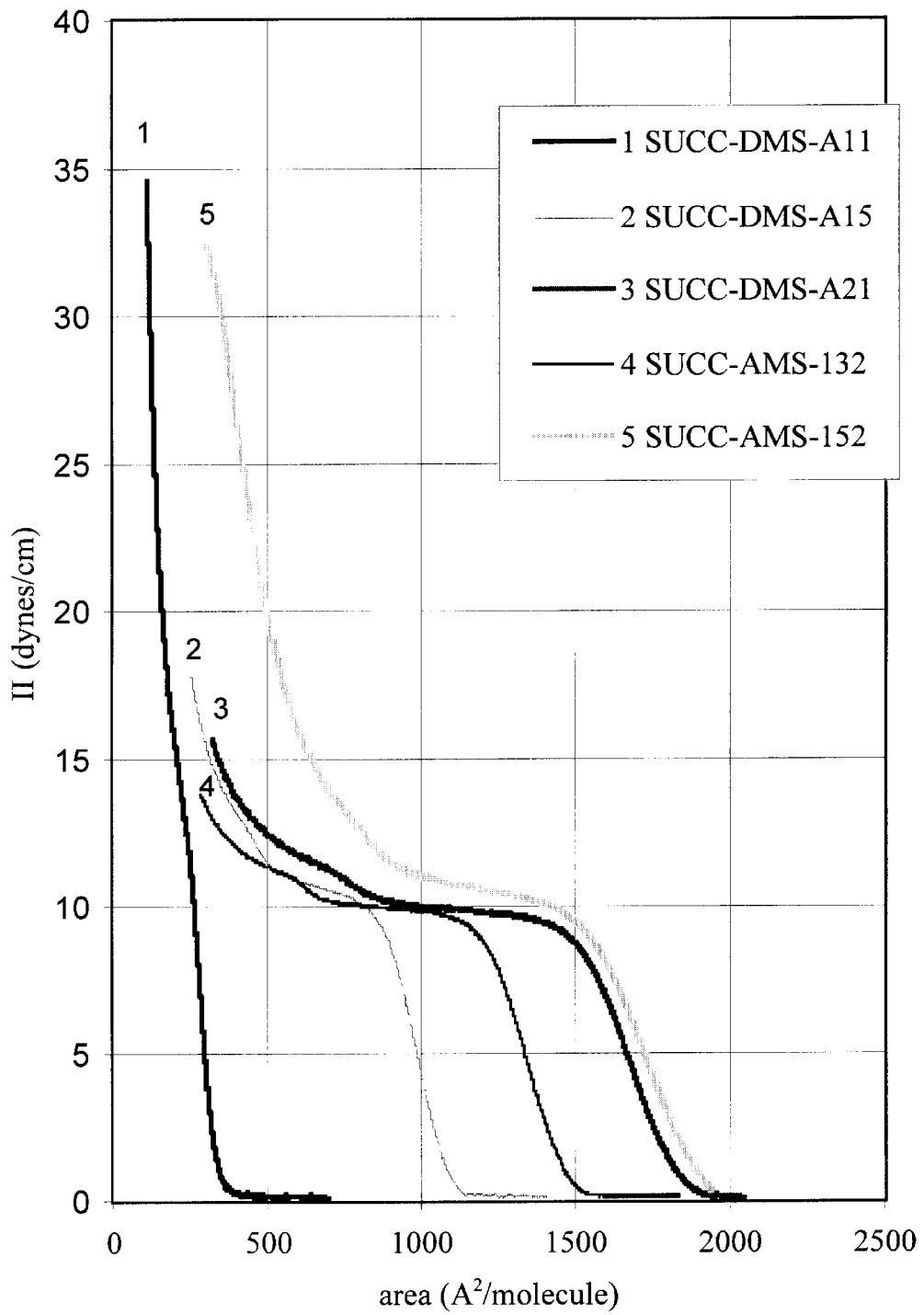
FIG. 2 is a graph of surface pressure versus area on water subphase for various compounds made in accordance with the present invention incorporating an NTA chelating ligand.
Figure 3:
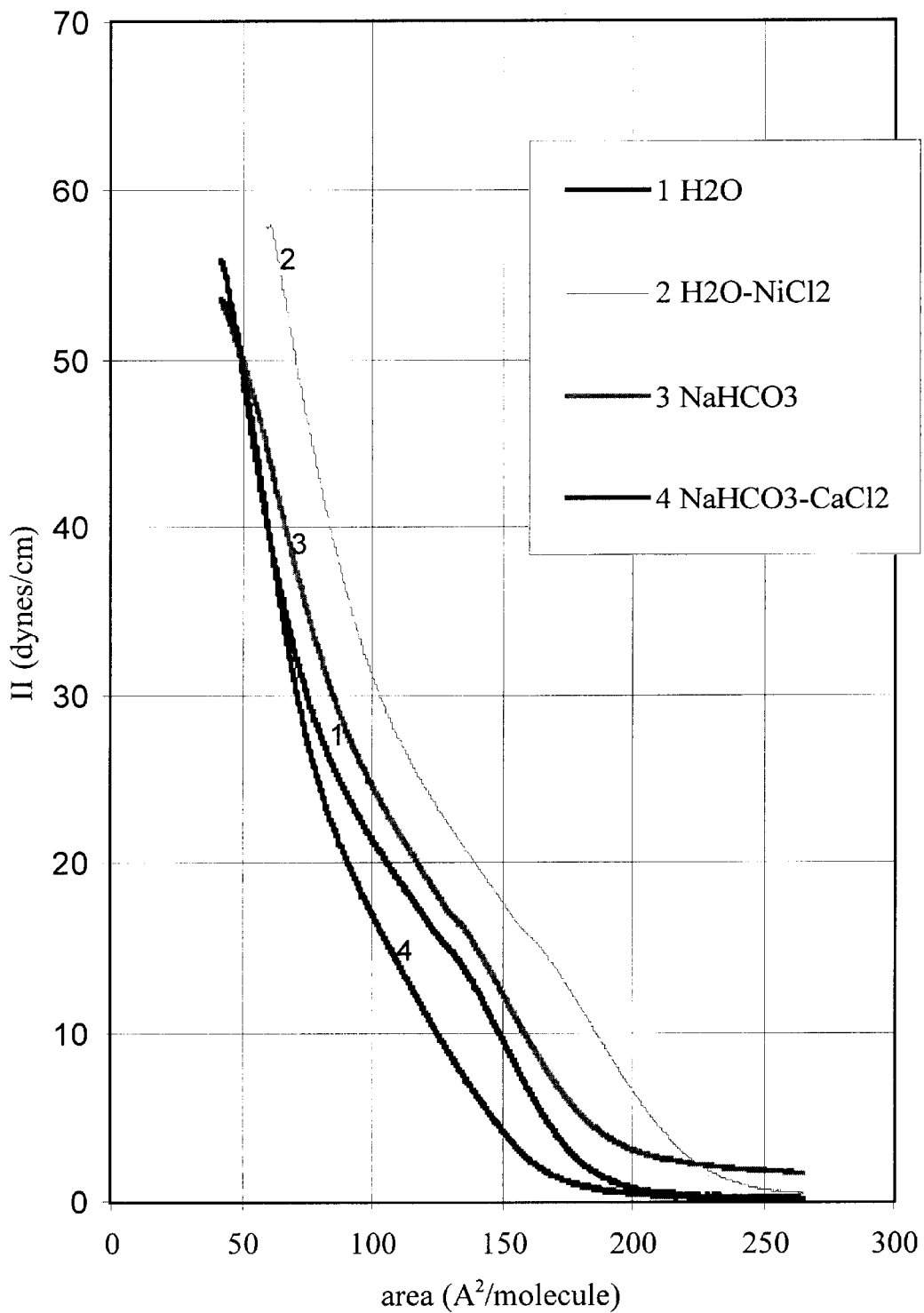
FIG. 3 is a graph of surface pressure versus area on various aqueous subphases for N-,N-Bis(carboxymethyl)-L-lysine terminated polydimethylsiloxane DMS-A11.
Figure 4:
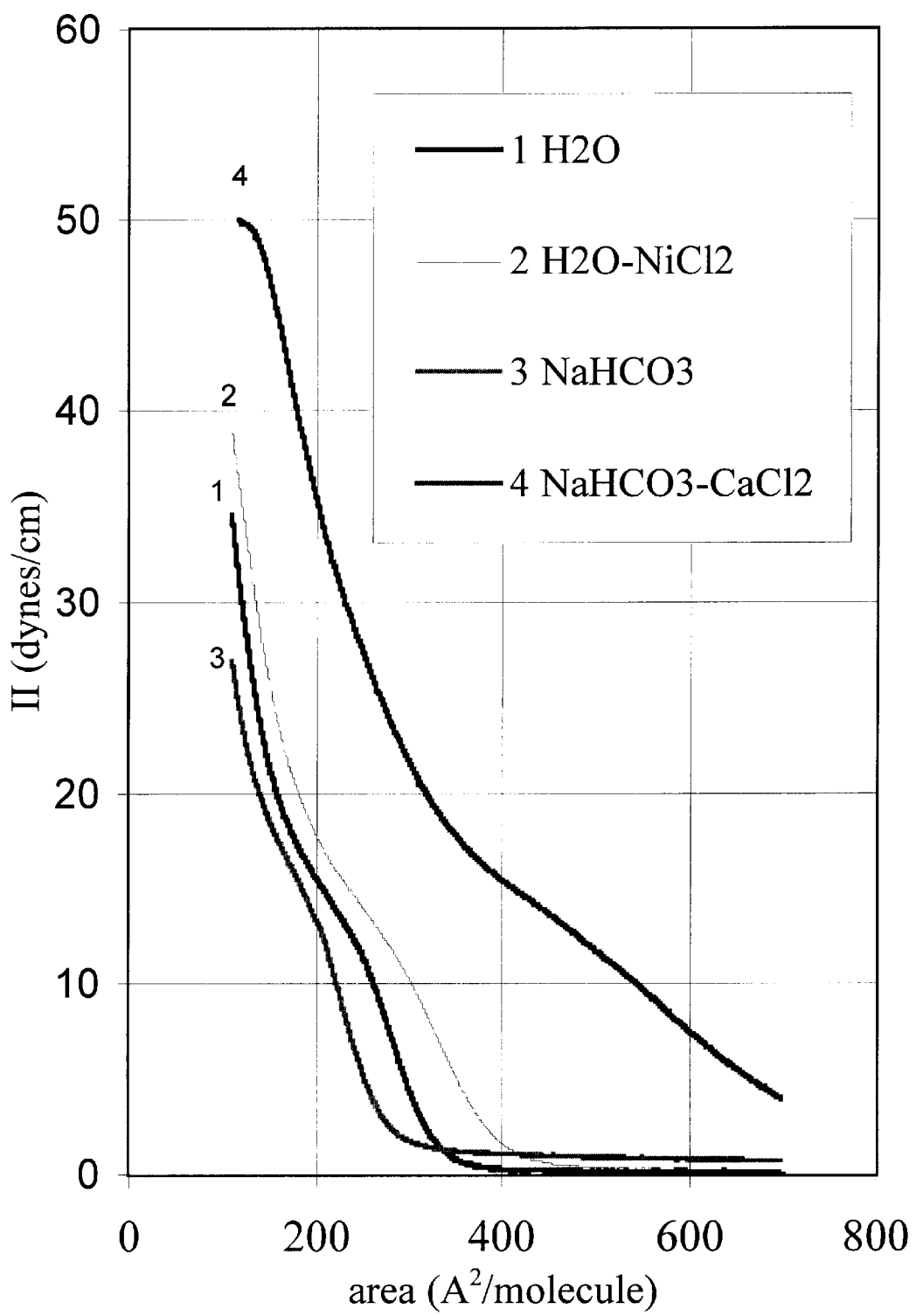
FIG. 4 is a graph of surface pressure versus area on various aqueous subphases for Succinyl-Terminated Polydimethylsiloxane DMS-A11.
Figure 5:
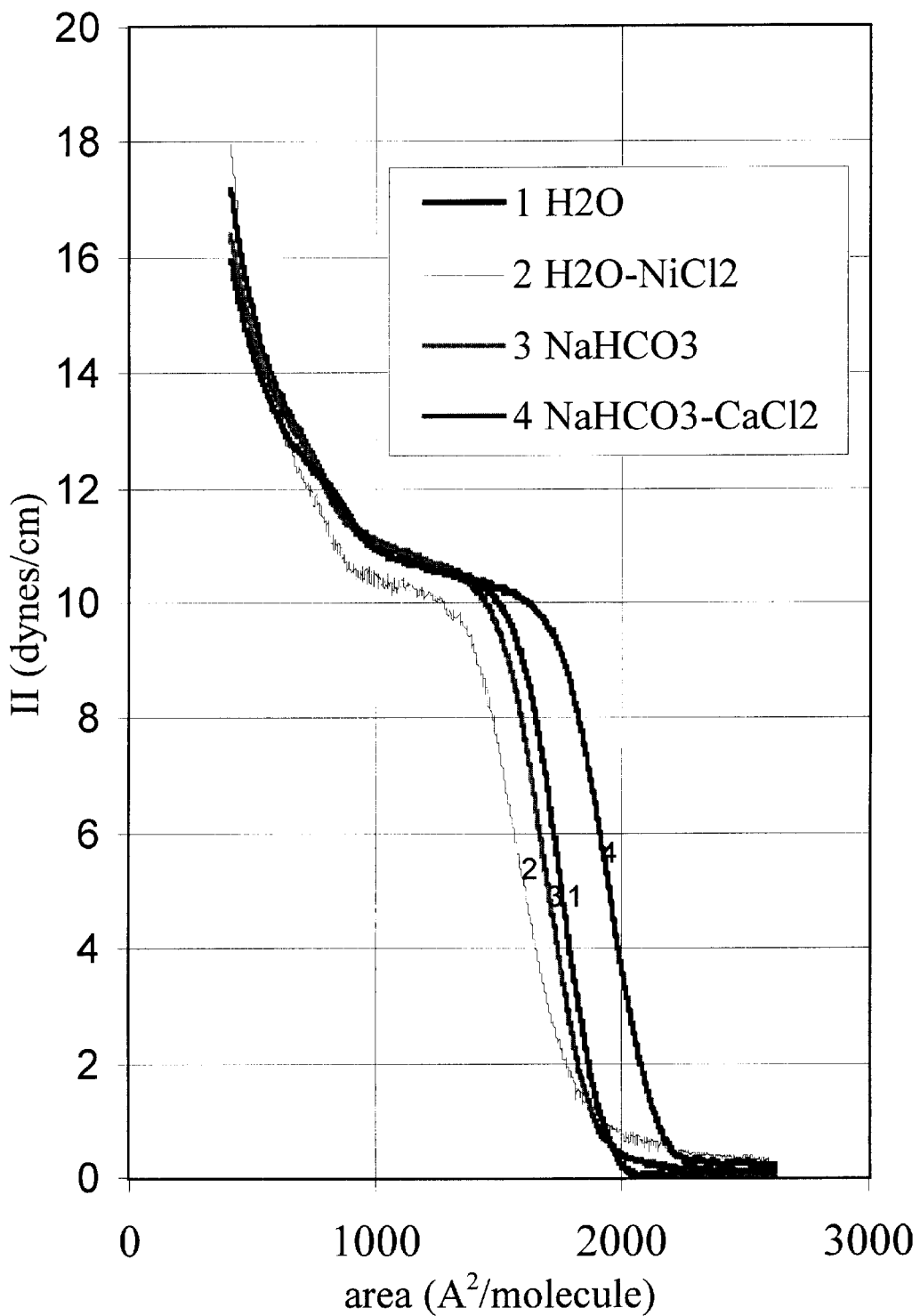
FIG. 5 is a graph of surface pressure versus area on various aqueous subphases for N-,N-Bis(carboxymethyl)-L-lysine-terminated polydimethylsiloxane DMS-A21.
Figure 6:
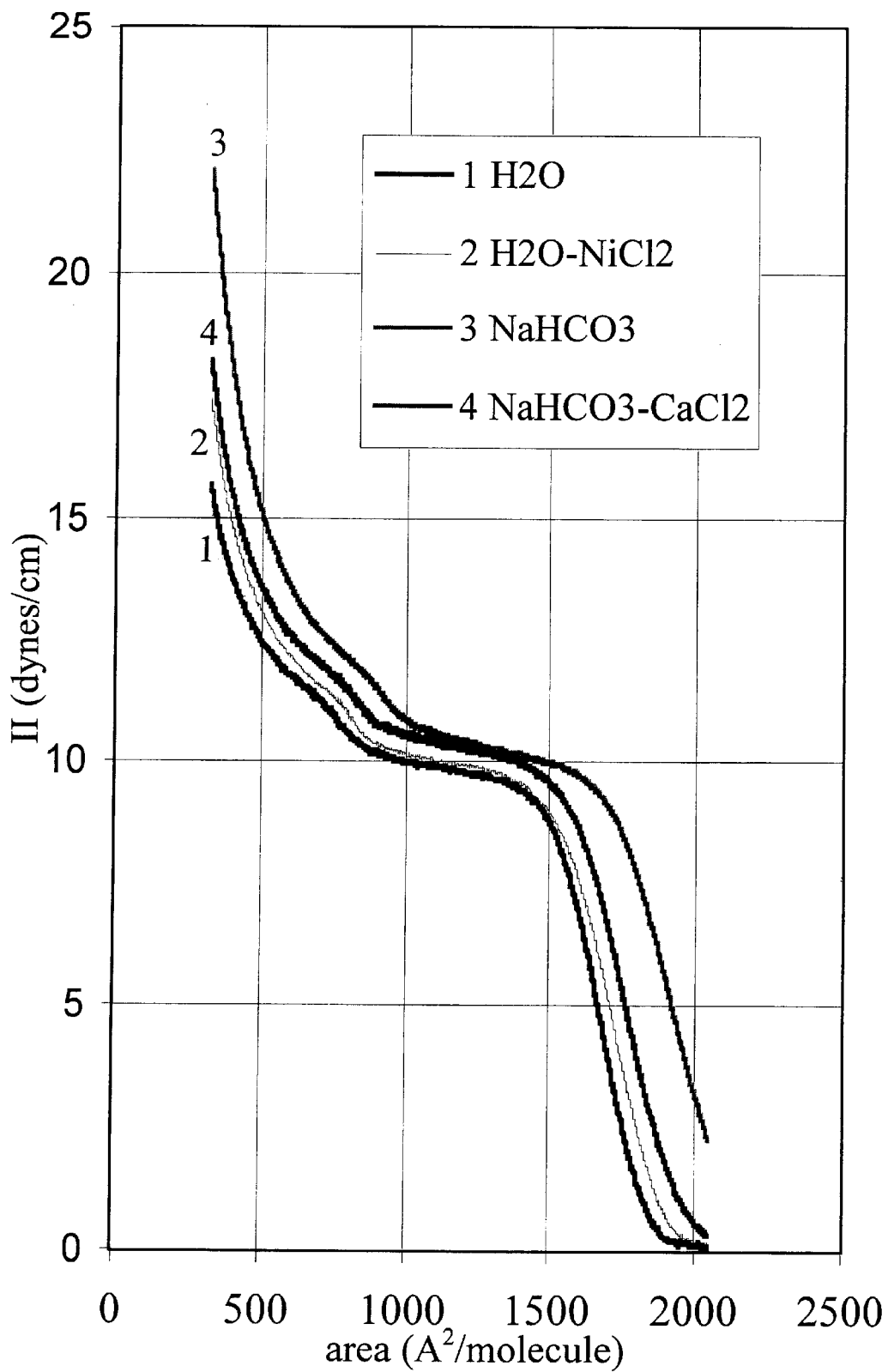
FIG. 6 is a graph of surface pressure versus area on various aqueous subphases for Succinyl-Terminated Polydimethylsiloxane DMS-A21.

Molecular weight exerts an important influence on pressure and area/molecule at collapse, as may be seen in Table 2, and FIGS. 1 and 2. It is noted that the pressure at collapse ($P_F$) decreases as the molecular weight increases for both succinyl- ("SUCC") and NTA-end-functional polysiloxane oligomers. For example, for the succinyl-end functional series the pressure at collapse decreases from 34.6 mN/m (SUCC-DMS-A11) to 15.7 mN/m (SUCC-DMS-A21). This difference is even more dramatic for NTA-end-functional compounds. Collapse pressures for NTA-DMS-A11 and NTA-DMS-A21 is 55.8 and 17.2 mN/m, respectively.

The presence of multiple tethering functional groups pendant from the backbone of SUCC-AMS-152 and NTA-AMS-152 also leads to better anchoring of the film to the subphase and results in a significant increase of collapse pressure, in spite of the fact that these polymers have the highest molecular weights. High collapse pressure (27.1 mN/m) combined with a large area at collapse (444 Å²/molecule) for NTA-AMS-152 are consistent with molecules having multiple anchoring to the subphase.

TABLE 2

Pressure-Area Isotherms for Succinyl- and NTA-Functional Silicones on a Water Subphase.

| Silicone | MW | n[b)] | n/m[c)] | Collapse Pressure $P_F$ mN/m | Area at Collapse Å²/ Molecule |
|---|---|---|---|---|---|
| SUCC-DMS-A11 | 1100 | 8 | 4 | 34.6 | 110 |
| SUCC-DMS-A15 | 3400 | 40–41 | 20 | 18.3 | 247 |
| SUCC-DMS-A21 | 5500 | 68–69 | 34 | 15.7 | 320 |
| SUCC-AMS-A132 | 5160[a)] | 63–64[a)] | 39 | 13.8 | 289 |
| SUCC-AMS-A152 | 7935[a)] | 92–93[a)] | 21 | 32.4 | 305 |
| NTA-DMS-A11 | 1530 | 8–9 | 4 | 55.8 | 42 |
| NTA-DMS-A15 | 5230 | 58 | 29 | 18.6 | 237 |
| NTA-DMS-A21 | 6860 | 80 | 40 | 17.2 | 411 |
| NTA-AMS-132 | 5560[a)] | 63–64[a)] | 39 | 16.8 | 370 |
| NTA-AMS-152 | 9000[a)] | 92–93[a)] | 21 | 27.1 | 444 |

[a)]calculated from manufacturer specifications
[b)]n = number of dimethylsiloxy units in the backbone
[c)]m = number of functional groups per molecule π-A isotherms were measured on aqueous subphases containing $5 \times 10^{-4}$ M $NiCl_2$ (pH 6.8–7.0), $5 \times 10^{-4}$ M $CaCl_2$ (pH 7.9, $NaHCO_3$ solution), and $NaHCO_3$ (pH 7.9) for the various compounds prepared. Tables 3–5 summarize the experimental results.

TABLE 3

Pressure-Area Isotherms for Succinyl- and NTA-Functional Silicones on Water/NiCl₂ Subphase.

| Silicone | Collapse Pressure $P_F$ mN/m |
|---|---|
| SUCC-DMS-A11 | 39.2 |
| SUCC-DMS-A15 | 16.1 |
| SUCC-DMS-A21 | 17.4 |
| SUCC-AMS-132 | 14.6 |
| SUCC-AMS-152 | 34.3 |
| NTA-DMS-A11 | 57.8 |
| NTA-DMS-A15 | 17.4 |
| NTA-DMS-A21 | 18.0 |
| NTA-AMS-132 | 15.9 |
| NTA-AMS-152 | 30.4 |

TABLE 4

π-A Isotherms on a NaHCO₃ (pH 7.9) Subphase.

| Silicone | MW | Collapse Pressure $P_F$ mN/m |
|---|---|---|
| SUCC-DMS-A11 | 1100 | 26.9 |
| SUCC-DMS-A15 | 3400 | 19.7 |
| SUCC-DMS-A21 | 5500 | 22.1 |
| SUCC-AMS-132 | 5160[a)] | 18.3 |
| SUCC-AMS-152 | 7935[a)] | 37.3 |
| NTA-DMS-A11 | 1530 | 53.3 |
| NTA-DMS-A15 | 5230 | 13.1 |
| NTA-DMS-A21 | 6860 | 16.4 |

TABLE 4-continued

π-A Isotherms on a NaHCO₃ (pH 7.9) Subphase.

| Silicone | MW | Collapse Pressure $P_F$ mN/m |
|---|---|---|
| NTA-AMS-132 | 5560[a)] | 17.0 |
| NTA-AMS-152 | 9000[a)] | 26.9 |

[a)]calculated from manufacturer specifications

TABLE 5

π-A Isotherms on a NaHCO₃/CaCl₂ (pH 7.9) Subphase.

| Silicone | MW | Collapse Pressure $P_F$ mN/m |
|---|---|---|
| SUCC-DMS-A11 | 1100 | 50.0 |
| SUCC-DMS-A15 | 3400 | 23.2 |
| SUCC-DMS-A21 | 5500 | 18.2 |
| SUCC-AMS-132 | 5160[a)] | 16.5 |
| SUCC-AMS-152 | 7935[a)] | 39.6 |
| NTA-DMS-A11 | 1530 | 53.5 |
| NTA-DMS-A15 | 5230 | 13.4 |
| NTA-DMS-A21 | 6860 | 16.0 |

TABLE 5-continued

π-A Isotherms on a NaHCO₃/CaCl₂ (pH 7.9) Subphase.

| Silicone | MW | Collapse Pressure $P_F$ mN/m |
|---|---|---|
| NTA-AMS-132 | 5560[a] | 15.7 |
| NTA-AMS-152 | 9000[a] | 31.2 |

[a]calculated from manufacturer specifications

Tables 3–5 demonstrate that the change in the solution pH from 6.8–7.0 (water) to 7.9–8.0 (NaHCO₃ solution) has a small but noticeable influence on the isotherms of both NTA- and succinyl-functionalized silicones. The collapse pressure $P_F$ for NTA-derivatives decreases at higher pH values. It is quite likely lo that the pH at the interface is actually lower than in the subphase, and that a significant number of the carboxylic acid groups in the tricarboxylic acid anchoring component of the polymer are ionized. As more carboxylic acid groups are ionized the electrostatic repulsive forces between these negatively charged groups might destabilize the cohesion of the monolayer. Collapse pressures for succinyl-compounds increase at higher pH in the subphase.

As illustrated in Tables 3–5, and FIGS. 3–6, the presence of $Ni^{2+}$ or $Ca^{2+}$ in the subphase has a marked effect on the surface behavior of both NTA- and succinyl-functional silicones and on the collapse pressure of functional silicones of all molecular weights and degrees of functionalization. Nickel and calcium increase the collapse pressure of succinyl-functional silicones by 0.8–4.6 mN/m and 2.5–15.4 mN/m respectively (with the exception of SUCC-DMS-A15). The behavior of NTA-functional oligomers on $Ni^{2+}$ and $Ca^{2+}$ subphases was quite different from the one exhibited by succinyl-functional silicones. These differences may be attributed to the presence in the of the tricarboxylic acids and their ability to sequester ions, which simultaneously leads to a change in surface activity.

It will be appreciated that the metal binding site may be any site which binds metals. Some common examples include EDTA, NTA, IDA (iminodiacetic acid), NTAA (nitrylotriacetic acid), and DTPA (diethylene triamine pentaacetic acid).

What is claimed is:

1. A silicone polymer comprising a hydrophobic polysiloxane backbone and at least one metal binding site which is covalently bound to the hydrophobic polysiloxane backbone, wherein each metal binding site comprises at least two ligands which are capable of binding to a metal.

2. The silicone polymer of claim 1 wherein at least one of the ligands is hydrophilic either before or after being bound to a metal.

3. The silicone polymer of claim 1 wherein at least one of the ligands is selected from the group of ligands consisting of: i) functional alkyl or aryl groups bearing heteroatom-based ligands, ii) functional alkyl or aryl groups bearing heteroatom-based ligands where the ligands possess exchangeable hydrogens and iii) functional alkyl or aryl groups bearing π-ligands.

4. The silicone polymer of claim 3, wherein at least one of the ligands comprises exchangeable hydrogen groups.

5. The silicone polymer of claim 4 wherein the exchangeable hydrogen groups are selected from the group consisting of OH, NH, SH and PH.

6. The silicone polymer of claim 5 wherein the exchangeable hydrogen groups are selected from the group consisting of OH and NH.

7. The silicone polymer of claim 6 wherein the metal binding site comprises two or more carboxylic acid groups.

8. The silicone polymer of claim 7 wherein the metal binding site comprises a group selected from the group of formulas consisting of:

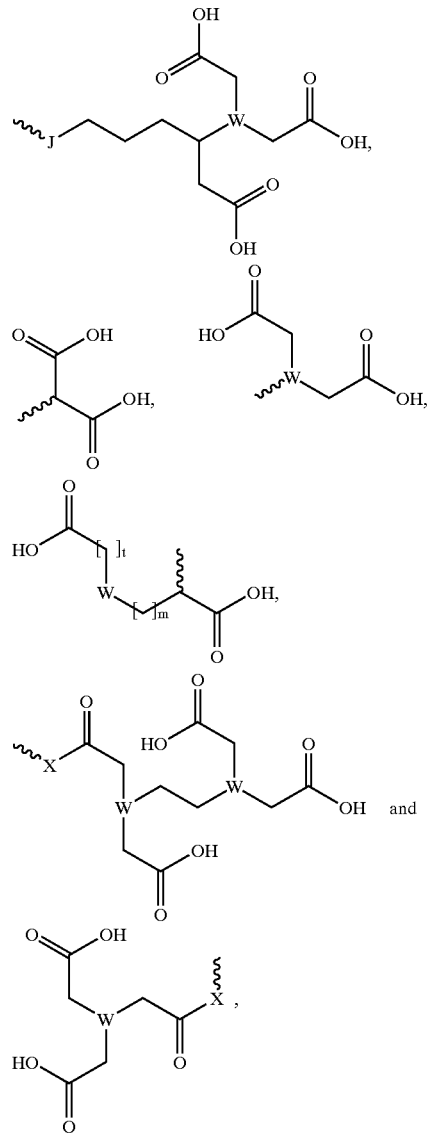

where W is N, P, or C; X is C, N, O or S; J is N, O, S, P, or C; t is between 1 and 10; m is between 0 and 10 and the wavy line denotes direct or indirect attachment of the metal binding site to the hydrophobic polysiloxane backbone.

9. The silicone polymer of claim 1 wherein each metal binding site is covalently bound to the hydrophobic polysiloxane backbone via a linker which is more stable to hydrolysis than the siloxane linkage in the silicone polymer backbone.

10. The silicone polymer of claim 9 wherein the linker is selected from the group of linkers consisting of C, N, O, S, P, amides, esters, thioesters, urethanes, ureas, alkyl, aryl, functional alkyl or functional aryl groups.

11. The silicone polymer of claim 10 wherein the linker is selected from the group of linkers consisting of

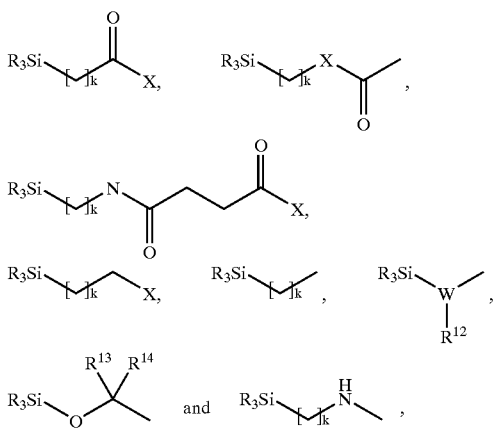

where k is between 0 and 10;

X is C, N, O, S, W is N, P, or C, $R^{12}$ is H, alkyl, aryl, functional alkyl or functional aryl, $R^{13}$ and $R^{14}$ are independently H, alkyl, aryl, functional alkyl or functional aryl, alkoxy or siloxy, and $R_3Si$ is the silicone polymer backbone.

12. The silicone polymer of claim 11 wherein the metal binding site bound to a linker is selected from the group consisting of the following formulas:

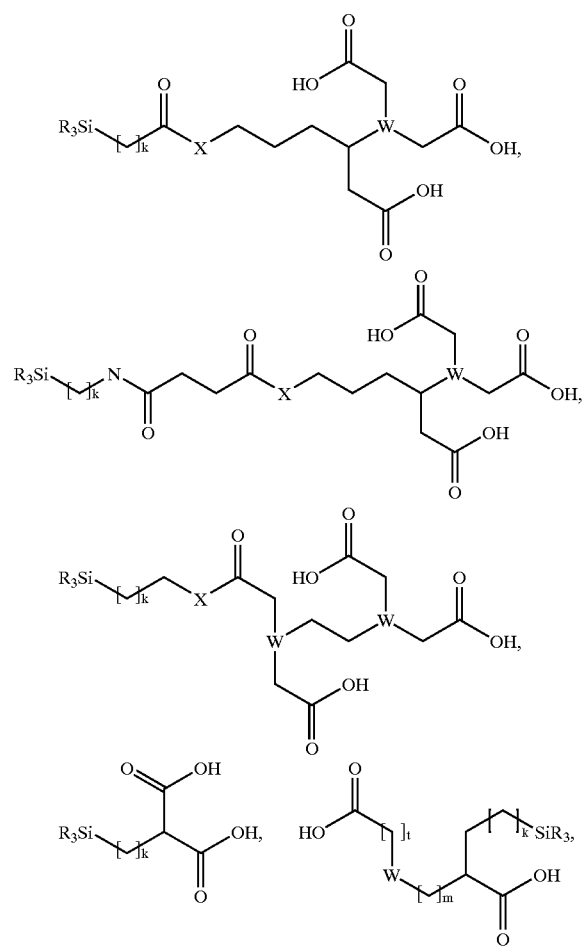

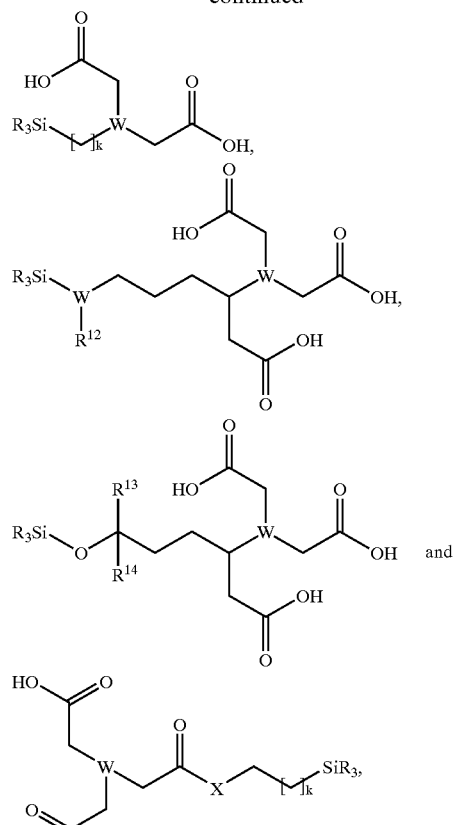

where

W is N, P, or C;

X is C, N, O or S;

t is between 1 and 10;

k is between 0 and 10;

m is between 0 and 10;

$R^{12}$, $R^{13}$, and $R^{14}$ are as defined in claim 11; and $R_3Si$ is the silicone polymer backbone.

13. The silicone polymer of claim 10 wherein the metal binding site is $N^\alpha,N^\alpha$-bis(carboxymethyl)-L-lysine (NTA).

14. The silicone polymer of claim 13 wherein the polysiloxane backbone is a polydimethylsiloxane.

15. The silicone polymer of claim 10 wherein the polymer is selected from the group of compounds consisting of $N^\alpha,N^\alpha$-bis(carboxymethyl)-L-lysine terminated polydimethylsiloxane (NTA-DMS-A11), $N^\alpha,N^\alpha$-bis(carboxymethyl)-L-lysine terminated polydimethylsiloxane (NTA-DMS-A15), $N^\alpha,N^\alpha$-bis(carboxymethyl)-L-lysine terminated polydimethylsiloxane (NTA-DMS-A21), $N^\alpha,N^\alpha$-bis(carboxymethyl)-L-lysine pendant polydimethylsiloxane (NTA-AMS-132), $N^\alpha,N^\alpha$-bis(carboxymethyl)-L-lysine pendant polydimethylsiloxane (NTA-AMS-152), $N^\alpha,N^\alpha$-bis(carboxymethyl)-L-lysine pendant polydimethylsiloxane (NTA-AMS-162) and compounds of the following general formula:

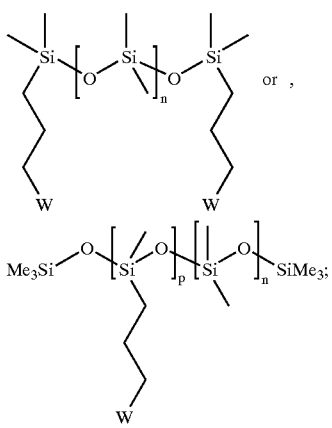

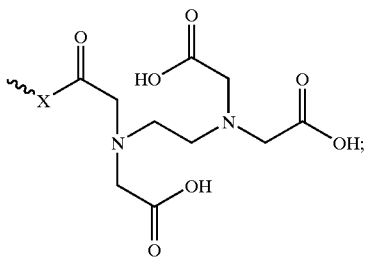

where W is a group of the formula:

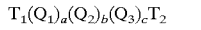

X is O or N; and p is greater than or equal to 1, n is greater than or equal to 0, and with the proviso that the total molecular weight of the silicone polymer is between about 500 and 500,000 g/mol; and wherein DMS refers to amino propyl-terminated polydimethyl-siloxane and AMS refers to aminopropylmethylsiloxane-dimethylsiloxane copolymer.

16. The silicone polymer of claim 1 wherein at least one metal binding site comprises ligands selected from the group of ligands consisting of bi, tri, tetra, penta and hexadentate ligands.

17. The silicone polymer of claim 1 having a molecular weight of between about 500 and about 500,000 g/mol.

18. The silicone polymer of claim 17 having a molecular weight of between about 500 and about 15,000 g/mol.

19. The silicone polymer of claim 18 having a molecular weight of between about 1500 and about 15,000 g/mol.

20. The silicone polymer of claim 1, wherein the ligand is bound to a metal.

21. The silicone polymer of claim 20 wherein the metal is selected from a group of metals consisting of alkali metals, alkaline earth metals, Group 13 elements, transition metals, lanthanides and actinides.

22. The silicone polymer of claim 20 wherein the metal is a metal ion.

23. The silicone polymer of claim 22 wherein the metal ion is selected from a group of metal ions consisting of $Ca^{2+}$, $Mg^{2+}$, $Ni^{2+}$, $Fe^{3+}$, $Cu^{2+}$, and $Co^{2+}$.

24. The silicone polymer of claim 1 having a formula I:

$$T_1(Q_1)_a(Q_2)_b(Q_3)_cT_2 \qquad (I)$$

wherein a, b and c are independently greater than or equal to 0; and where $Q_1$, $Q_2$ and $Q_3$ are independently the same or different and are:

(A) an internal siloxane group of the formula II:

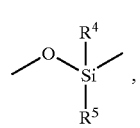

(II)

wherein $R^4$ and $R^5$, for each internal siloxane group of the formula II, are the same or different, and $R^4$ and $R^5$ are independently
H, with the proviso that both $R^4$ and $R^5$ are not H on the same internal siloxane group of the formula (II),
alkoxy,
siloxy,
alkyl,
aryl,
functional alkyl,
functional aryl,
or a metal-binding site comprising at least two ligands capable of binding to a metal,
or (B) an internal siloxane group of the formula III:

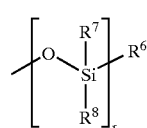

(III)

wherein r is $\geq 0$;
$R^7$, and $R^8$, for each internal siloxane group are the same or different, and
$R^6$, $R^7$, and $R^8$ are independently
H, with the proviso that not more than one of $R^6$, $R^7$, and $R^8$ is H on any one internal siloxane group of the formula (III),
alkoxy,
siloxy,
alkyl,
functional alkyl,
aryl,
functional aryl,
or a metal binding site comprising at least two ligands capable of binding to a metal;
$T_1$ is a group of the formula (IV):

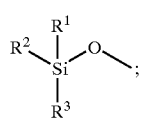

(IV)

$T_2$ is a group of the formula (V):

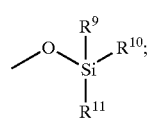

(V)

wherein, $R^1$, $R^2$, $R^3$, $R^9$, $R^{10}$ and $R^{11}$ are independently, H, alkoxy, siloxy, alkyl, functional alkyl, aryl, functional aryl, or a metal binding site comprising at least two ligands optionally bound to a metal with the proviso that the silicon atom in formula (IV) or (V) has no more than one H;

and with the provisos that at least one of $R^1$ to $R^{11}$ is a metal binding site comprising at least two ligands optionally bound to a metal and the molecular weight of the silicone polymer is between about 500 and about 500,000 g/mol.

25. The silicone polymer of claim 24 wherein the molecular weight is between about 500 and about 15,000 g/mol.

26. The silicone polymer of claim 25 wherein the molecular weight is between about 1500 and about 15,000 g/mol.

27. The silicone polymer of claim 26 wherein at least one of $R^1, R^2, R^3, R^9, R^{10}, R^{11}$ is a metal binding site comprising at least two ligands capable of binding to a metal.

28. The silicone polymer of claim 8 wherein at least one of $R^1, R^2, R^3$, and at least one of $R^9, R^{10}, R^{11}$ is a metal binding site comprising at least two ligands capable of binding to a metal.

29. The silicone polymer of claim 24, wherein at least one of $R^4, R^5, R^6, R^7$, and $R^8$ is a metal binding site comprising at least two ligands capable of binding to a metal.

30. The silicone polymer of claim 29, comprising at least one metal binding site bound to one of every 5 to 200 internal siloxane groups.

31. The silicone polymer of claim 11, wherein the linker is selected from the group of linkers consisting of:

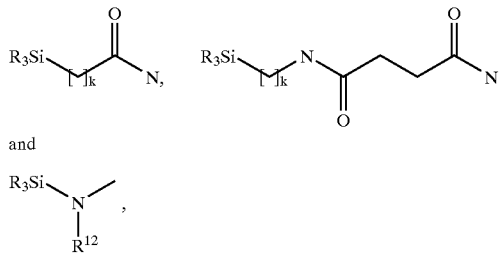

where k between 0 and 10, $R^{12}$ is H, alkyl, aryl, functional alkyl or functional aryl and $R_3Si$ is the silicone polymer backbone.

* * * * *